United States Patent [19]

Yamamoto et al.

[11] Patent Number: 4,933,865
[45] Date of Patent: Jun. 12, 1990

[54] APPARATUS FOR RECOGNITION OF DRAWN SHAPES OR VIEW TYPES FOR AUTOMATIC DRAWING INPUT IN CAD SYSTEM

[75] Inventors: Masanari Yamamoto, Kawasaki; Yoshikazu Ito, Inagi; Michiko Iwasaki, Yokohama; Hiroaki Harada, Yokohama; Masako Nishijima, Yokohama, all of Japan

[73] Assignee: Fujitsu Limited, Kawasaki, Japan

[21] Appl. No.: 134,977

[22] Filed: Dec. 18, 1987

[30] Foreign Application Priority Data

Dec. 20, 1986 [JP] Japan ................................ 61-304451
Jun. 3, 1987 [JP] Japan ................................ 62-139116
Jun. 18, 1987 [JP] Japan ................................ 62-151604
Jun. 18, 1987 [JP] Japan ................................ 62-151606

[51] Int. Cl.$^5$ ............................................. G06F 15/64
[52] U.S. Cl. ................................. 364/518; 382/16; 382/25; 364/474.24
[58] Field of Search .............. 364/512, 518, 474.22, 364/474.24; 382/8, 9, 16, 25, 28

[56] References Cited

U.S. PATENT DOCUMENTS 4,388,610  6/1983  Tsunekawa ............................ 382/8
4,644,583  2/1987  Watanabe et al. ................ 382/25 X
4,747,153  5/1988  Kouno et al. ......................... 382/25

OTHER PUBLICATIONS

Product Brochure For: Fujitsu, Advanced Drawing Capture System (FADCS) [FACOM 2510], Japan.
Digitization and Segmentation of Circuit Diagrams, H. Bley (Universitat Erlangen-Nurnberg), Proc. 1st Scand. Conf. Image Anal. Linkoping (Sweden), 1980, pp. 264-269.
Segmentation and Preprocessing of Electrical Schematics Using Picture Graphs, H. Bley (Universitat Erlangen-Nurnberg), Computer Vision, Graphics, and Image Processing, 28, 1984, pp. 271-288.
Automatic Interpretation of Line and Text in Circuit Diagrams, H. Bunke, (Universitat Erlangen-Nurnberg), "Pattern Recognition Theory and Applications", J. Kitter, K. S. Fu, L. F. Pau (eds.), pp. 297-310, 1982, (D. Reidel Publishing).
Automated Conversion of Mechanical Engineering Drawings to CAD Models: Too Many Problems?, (L. J. Hofer-Alfeis, G. Maderlechner Siemens), IAPR Workshop on CV, Oct. 12-14, 1988, Tokyo, pp. 206-209.

(List continued on next page.)

Primary Examiner—Gary V. Harkcom
Assistant Examiner—Mark K. Zimmerman
Attorney, Agent, or Firm—Staas & Halsey

[57] ABSTRACT

An apparatus for recognition of shapes in drawings for automatic drawing input in a CAD system including a centerline extraction unit for extracting centerlines drawn in center positions of shapes from the line segments discriminated by a line segment discrimination unit, a symmetry determination unit for determining symmetry of shapes based on intersections between the extracted centerlines and straight lines between end points of contour lines, distances between the endpoints of contour lines and the intersections, angles between the centerlines and the straight lines between endpoints of contour lines, and a shape recognition unit for recognizing, using the result of determination of the symmetry determination unit, a shape, a length of line segment, and a position of line segment not indicated by deriving the shape, the length of line segment, and the position of line segment from a shape, a length of line segment, and a position of line segment indicated, and characters recognized by a character recognition unit. In connection with this shape recognition apparatus, an apparatus is provided for recognition of views in drawings for automatic drawing input. Also, shape recognition apparatuses are provided for setting dimensional values known in other views or derived dimension values calculated on the basis of known dimensional values to contour lines, and for adding line segments by producing a line segment based on a matching check.

7 Claims, 39 Drawing Sheets

OTHER PUBLICATIONS

Recognition of Freehand Drawings in Chemical Plant Engineering, H. Harada, Y. Itoh, M. Ishii (Fujitsu), IEEE Workshop on Computer Architecture for Pattern Analysis and Image Database Management (CAPAIDM), Miami, Nov. 18-20, 1985, pp. 146-153.

An Automatic Input System of Logic Circuit Diagram for CAD, M. Ishii, M. Iwasaki, T. Yamashita, (Fujitsu), Int. Conf. on Computer Aided Design and Systems (Jul. 3-6, 1979), pp. 123-126.

An Experimental Input System of Hand-Drawn Logic Circuit Diagram for LSI CAD, M. Ishii, M. Yamamoto, M. Iwasaki, H. Shiraishi, (Fujitsu), DA Conf. '79.

A Character Recognition System with Learning Dictionary for Handwritten Drawings.

Drawing Element Separation, Symbol Recognition, and Character Recognition in Automatic Drawing Inputting System.

Understanding Machine Drawings Using a Planning Network and a Geometric Modeller.

Logic Diagram Recognition by Divide and Synthesize Method, S. Kakumoto, Y. Fujimoto, J. Kawasaki, (Hitachi), IFIP Workshop Conference, pp. 457-469, Mar. 1978.

Automatic Digitizing Method of Dotted and Broken Lines in Drawings.

Recognition of Broken Line and Chain Line by Histgram Classification Method.

A Recognition Algorithm of Dashed and Chained Lines for Automatic Inputting of Drawings.

Automatic Recognition System for Mechanical Drawings "ARCADIA-M", Overview and System Structure.

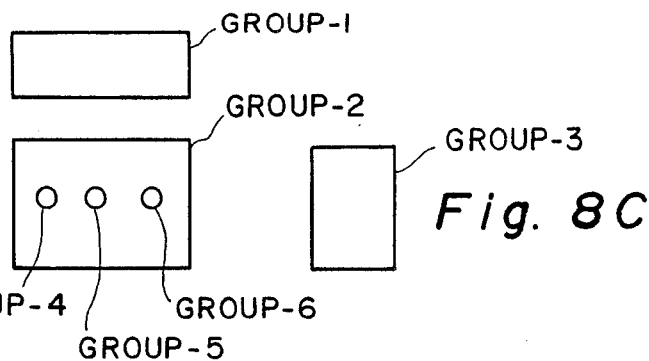
Fig. 8A — GROUP-1
Fig. 8B — GROUP-2, GROUP-4, GROUP-5, GROUP-6
Fig. 8C — GROUP-3
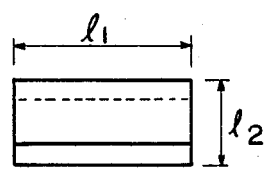
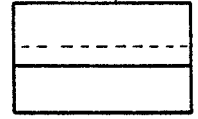
Fig. 9A, Fig. 9B, Fig. 9C
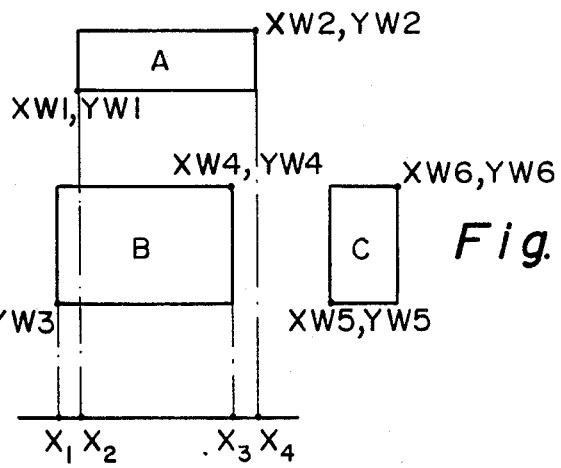
Fig. 10A, Fig. 10B, Fig. 10C

GROUPS

TABLE

|      | LEFT  | RIGHT | TOP | BOTTOM |
|------|-------|-------|-----|--------|
| G 1  | —     | *G 4  | —   | G 2    |
| G 2  | —     | G 3   | G 1 | —      |
| G 3  | G 2   | —     | G 4 | —      |
| G 4  | *G 1  | —     | —   | G 3    |

Fig. 13

| No. | TYPE | LEFT | RIGHT | TOP | BOTTOM |
|---|---|---|---|---|---|
| 1 | FRONT VIEW | O | O | O | O |
| 2 | TOP VIEW | × | × | × | O |
| 3 | RIGHT SIDE VIEW | O | O | × | × |
| 4 | REAR VIEW | O | × | × | × |
| 5 | LEFT SIDE VIEW | × | O | × | × |
| 6 | BOTTOM VIEW | × | × | O | × |
| * | OTHER VIEWS | * | * | * | * |

VERTEX COORDINATES ARRANGED FOR EACH VIEW IN RISING ORDER AND MERGED (SEPARATELY FOR X AXIS, Y AXIS) F: FRONT VIEW, P: TOP VIEW, R: RIGHT SIDE VIEW

Fig. 20

INDICATED DIMENSIONS SET FOR MERGED VERTEX
COORDINATES FOR EACH VIEW

| $R_X$ | $r_{x1}$ | $r_{x2}$ |
|---|---|---|
| $r_{x1}$ | | |
| $r_{x2}$ | | E |

| $R_Y$ | $r_{y1}$ | $r_{y2}$ | $r_{y3}$ |
|---|---|---|---|
| $r_{y1}$ | | | |
| $r_{y2}$ | | | – |
| $r_{y3}$ | | | |

| $P_X$ | $p_{x1}$ | $p_{x2}$ | $p_{x3}$ | $p_{x4}$ |
|---|---|---|---|---|
| $p_{x1}$ | | | | |
| $p_{x2}$ | – | | | |
| $p_{x3}$ | – | D | | |
| $p_{x4}$ | – | C | – | |

| $P_Y$ | $p_{y1}$ | $p_{y2}$ |
|---|---|---|
| $p_{y1}$ | | |
| $p_{y2}$ | – | |

A-B CALCULATION POSSIBLE

| $F_X$ | $f_{x1}$ | $f_{x2}$ | $f_{x3}$ | $f_{x4}$ |
|---|---|---|---|---|
| $f_{x1}$ | | | | |
| $f_{x2}$ | – | | | |
| $f_{x3}$ | – | – | | |
| $f_{x4}$ | – | – | – | |

| $F_Y$ | $f_{y1}$ | $f_{y2}$ | $f_{y3}$ |
|---|---|---|---|
| $f_{y1}$ | | | |
| $f_{y2}$ | * | | |
| $f_{y3}$ | A | B | |

Fig. 21

CORRESPONDENCE FOR EACH VIEW CONFIRMED BY NATURE OF THREE-VIEW DRAWINGS AND TABLES $T_x$, $T_y$ AND $T_z$ PREPARED

CONFIRM CORRESPONDENCE $$\begin{cases} f_{x1} \longleftrightarrow P_{x1} & f_{x2} \longleftrightarrow P_{x2} & f_{x3} \longleftrightarrow P_{x3} & f_{x4} \longleftrightarrow P_{x4} \\ (x_1) & (x_2) & (x_3) & (x_4) \\ P_{y1} \longleftrightarrow r_{z1} & P_{y2} \longleftrightarrow r_{z2} & & \\ (y_1) & (y_2) & & \\ f_{y1} \longleftrightarrow r_{y1} & f_{y2} \longleftrightarrow r_{y2} & f_{y3} \longleftrightarrow r_{y3} & \\ (z_1) & (z_2) & (z_3) & \end{cases}$$

Fig. 22

| TX | x1 | x2 | x3 | x4 |
|----|----|----|----|----|
| x1 |    |    | D  | —  |
| x2 |    |    | —  | —  |
| x3 |    |    |    | —  |
| x4 |    |    |    | C  |

| TY | y1 | y2 |
|----|----|----|
| y1 |    | E  |
| y2 |    |    |

| TZ | z1 | z2 | z3 |
|----|----|----|----|
| z1 |    | A-B | A |
| z2 |    |    | B |
| z3 |    |    |   |

INDICATED DIMENSIONS SET FOR CONFIRMED THREE-VIEW DRAWINGS CORRESPONDENCE COORDINATES WHEN CORRESPONDENCE STANDS, A, B, C, D, and E INTRODUCED

SETTING OF UNDETERMINED DIMENSION BY SYMMETRY $\ell$: ACTUAL DIMENSION
$\theta = \tan^{-1}\dfrac{(y_4-y_3)}{(x_4-x_3)}$
$x_1 = \ell \cos\theta \fallingdotseq X_1$
$y_1 = \ell \sin\theta \fallingdotseq Y_1$

L: LENGTH ON DRAWING $X_2 = L\cos\theta/S$
$Y_2 = L\sin\theta/S$

S: SCALE

CORRESPONDENCE AXIS

⊗ COINCIDENCE
× NON-COINCIDENCE

THEREFORE ADDED

INTERSECTION ⇒ HIDDEN LINE
(BROKEN LINE)

THEREFORE ADDED   INTERSECTION   THEREFORE ADDED

NO INTERSECTION
⇓
VISIBLE CONTOUR LINE
(SOLID LINE)

THEREFORE ADDED

APPARATUS FOR RECOGNITION OF DRAWN SHAPES OR VIEW TYPES FOR AUTOMATIC DRAWING INPUT IN CAD SYSTEM

BACKGROUND OF THE INVENTION

1. Field of the Invention

The present invention relates to an apparatus for the recognition of drawn shapes or view types for automatic drawing input in a CAD system.

2. Description of the Related Art

In recent years, the introduction of CAD systems in various fields for use in design work has helped shorten the manhours required for product development. At the present time, however, in the operation of such CAD systems, the design information is input into the computer manually, and thus inefficiently, posing a major problem. Therefore, consideration has been given to automatic drawing input apparatuses which can read drawings prepared by a designer as an image and automatically extract characters, symbols, line segments, and other design information from the image data using pattern recognition techniques, thus enabling the design information to be automatically input to the CAD system and increasing the efficiency of the design work.

Design drawings include electrical circuit diagrams, machine drawings, structural drawings, and the like, and an automatic input is difficult for machine and structural drawings. With circuit diagrams, as long as it is possible to recognize the logical connections it is possible to automatically output a corresponding diagram, but with machine and structural drawings, the shapes drawn and the logical connections are important, since dimensions and the like are also entered.

In general, machine drawings are drawn by the projection method. This is a requirement in many industrial standards, such as the Japan Industrial Standard (JIS). Drawings are prepared by the first-quadrant, third-quadrant, or other projection methods used for the preparation of machine drawings or structural drawings and include more than a single view. In a conventional apparatus for the automatic recognition of drawings, however, the apparatus treats even drawings of two views or more as a single view during the processing, i.e., the projection method is not considered. More machine drawings and structural drawings are drawn in three views by the third-quadrant method, and thus almost all design drawings cannot be handled by the conventional drawing recognition apparatus. Further, since no consideration is given to preparation by the projection method during recognition and processing, the obtained design information represents only a portion of the whole (only what is actually drawn, and with no attention paid to omitted portions), placing too great a work load on the CAD system.

Further, when drafting drawings by developing the shape of an object into a three-view drawing, including a top view, front view, and side view, and thus changing the types of lines with each view, as in the case of machine drawings and structural drawings, in general the designer tries to streamline the drawing by using a simplified notation method even for drawings incorporating complicated dimensions or angle information. This means that the shape recognition apparatus must be able to correctly recognize shapes of drafted drawings using the simplified notation method.

However, the shape recognition apparatuses used as automatic drawing input apparatuses for present day CAD systems are unable to understand the simplified notation method, and therefore, designers cannot use the simplified notation method and must prepare complicated drawings incorporating all the information needed to enable the shape recognition apparatuses to easily read such drawings.

For this reason, in conventional CAD systems, it takes a considerable amount of time for designers to draft drawings, and thus the merit of CAD systems is halved.

SUMMARY OF THE INVENTION

An object of the present invention is to enable the centerline of a drawing to be prepared by the simplified notation method so as to determine the symmetry of the shape, and using the characteristics of the symmetry, set the undetermined shape and length and position of line segments from the known shapes, line segments, and characters to recognize the shape and thus enable full display of the merits of CAD systems.

Another object of the present invention is to make it possible, in recognition of drawings prepared by development of a shape of an object into a three-view drawing, such as with machine drawings and structural drawings, to understand drafting methods based on the first-quadrant, third-quadrant, or other projection methods and to determine from the positions of the views the correspondence among the views.

Still another object of the present invention is to provide a recognition apparatus for drawings prepared by developing the shape of an object into three views, such as with machine drawings and structural drawings, wherein the method of drafting, such as the first quadrant, third quadrant, or other projection method, is understood by a predetermined system of marking used at the preparation of the drawings for enabling shape recognition and the dimensions of contours not directly indicated are set by reference to the correspondence among the views, thus enabling final determination of the shape.

A further object of the present invention is to provide a recognition apparatus for drawings prepared by developing the shape of an object into three views, such as with machine drawings or structural drawings, and using the simplified notation system, wherein the method of drafting, such as the first quadrant, third quadrant, or other projection method, is understood by a predetermined system of marking used at the preparation of the drawings for enabling shape recognition, the positions of the views are recognized, and a matching check is run while referring to the correspondence among the views, thereby pointing out locations where contradictions have occurred due to errors in drafting and lightening the work load in the succeeding CAD system, and wherein, further, the position and types of the omitted line segments are recognized, thereby enabling an acquisition of full drawing information, including the omitted line segments.

According to an aspect of the present invention, there is provided an apparatus for recognition of shapes in drawings for automatic drawing input in a CAD system, the apparatus including: a character recognition unit for recognizing types of shapes and character indicating lengths, angles, and the like of contour lines; a line segment discrimination unit for discriminating types of line segment in accordance with definitions assigned to each type of line segment based on data expressed in vector form; a centerline extraction unit for extracting centerlines drawn in center positions of shapes from the line segments discriminated by the line segment discrimination unit; a symmetry determination unit for determining the symmetry of a shape based on intersections between the extracted centerlines and straight lines between end points of contour lines, the distances between the endpoints of contour lines and the intersections, and angle between the centerlines and the straight lines between endpoints of contour lines; and a shape recognition unit for recognizing, using the results of the symmetry determination unit, a shape, a length of a line segment, and a position of a line segment not indicated by deriving the shape, the length of a line segment, and the position of a line segment from a shape, a length of a line segment, and a position of a line segment indicated, and characters recognized by the character recognition unit.

According to another aspect of the present invention, there is provided an apparatus for recognition of views in drawings for an automatic drawing input in a CAD system, the apparatus including: a drawing reading unit for reading a drawing to produce drawing data; a vector forming unit for receiving the drawing data from the drawing reading unit and producing vector data by deriving line information from point information in the drawing data; a figure element separation unit for receiving the vector data from the vector forming unit and carrying out a separation of figure elements in the vector data; a line type discrimination unit for receiving the separated figure element data from the figure element separation unit and carrying out a discrimination of types of lines in the figure element data; and a view discrimination unit for receiving the line type discrimination data from the line type discrimination unit and grouping the contours lines, checking the inclusive relationship, counting the number of non-inclusive contour lines, and determining the view in accordance with a predetermined criteria in correspondence with the numbers as the result of the counting to produce a discrimination conclusion concerning the views.

According to still another aspect of the present invention, there is provided an apparatus for recognition of shapes in drawings for an automatic drawing input in a CAD system, the apparatus including: a classification unit for classifying data of a drawing into character data and line segment data; a character discrimination unit for receiving character data from the classification unit and discriminating the character data; a line section discrimination unit for receiving the line segment data from the classification unit and discriminating the types of line segment, that is, whether a contour line or a supplementary line; a correspondence determination unit for receiving the character discrimination data and the line segment discrimination data from the character discrimination unit and the line segment discrimination unit and determining the correspondence between the data of the discriminated character, and the data of the discriminated contour line or supplementary line; view discrimination unit for receiving the line segment discrimination data from the line segment discrimination unit and discriminating the view by grouping the contour lines for each view; a vertex determination unit for receiving view discrimination data from the view discrimination unit and determining vertexes of the contour lines; a first dimension setting unit for receiving data from the correspondence determination unit and the vertex determination unit and setting dimensional values to the contour lines corresponding to the portions of views having the indications of dimensions; a dimension calculation unit for receiving data from the first dimension setting unit and calculating dimensional values of contour lines of portions having no indications of dimensions using the known dimensional values; and a second dimension setting unit for receiving the data from the dimension calculation unit and, utilizing the correspondence between views in accordance with the projection, setting the dimensional values known in another view or the derived dimensional values calculated on the basis of the known dimensional values to the contour lines.

According to still another aspect of the present invention, there is provided an apparatus for recognition of shapes in drawings for an automatic drawing input in a CAD system, the apparatus including: a contour line discrimination unit for discriminating contour lines in drawings; a view discrimination unit for discriminating views in drawings; a contour line data storage unit for receiving data from the contour line discrimination unit and the view discrimination unit and storing the received data; a vertex acquisition unit for receiving data from the contour line data storage unit and deriving coordinates of end points of contour lines which have been confirmed on the X and Y axes for each view; a matching check unit for receiving data from the vertex acquisition unit and data from storage of knowledge base and checking the matching between views on the basis of the correspondence between the positions of the vertexes and the number of vertexes to detect contradictory portions; and a line segment addition unit for receiving the data from the matching check unit and, when a contradictory portion is detected, selecting a type of line segment to be supplemented to a view which includes a vertex which does not satisfy the correspondence, producing a line segment of the selected type, and adding the produced line segment.

BRIEF DESCRIPTION OF THE DRAWINGS

In the drawings,

FIGS. 5, 5A and 5B are a flow chart of the operation of the apparatus of FIG. 3;

FIGS. 8 to 10 illustrate the processes of the operation of the apparatus of FIG. 6;

FIG. 13 is a table representing a criteria of relationship between views;

FIGS. 18 to 25 show a sequence of processes in the operation of the apparatus of FIG. 15;

DESCRIPTION OF PREFERRED EMBODIMENTS ((Description of Embodiment of FIG. 3))

Figure 4:
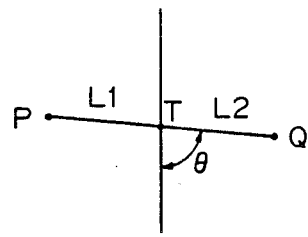
FIG. 4 illustrates a principle of the determination of symmetry in the apparatus of FIG. 3.
Figure 3:
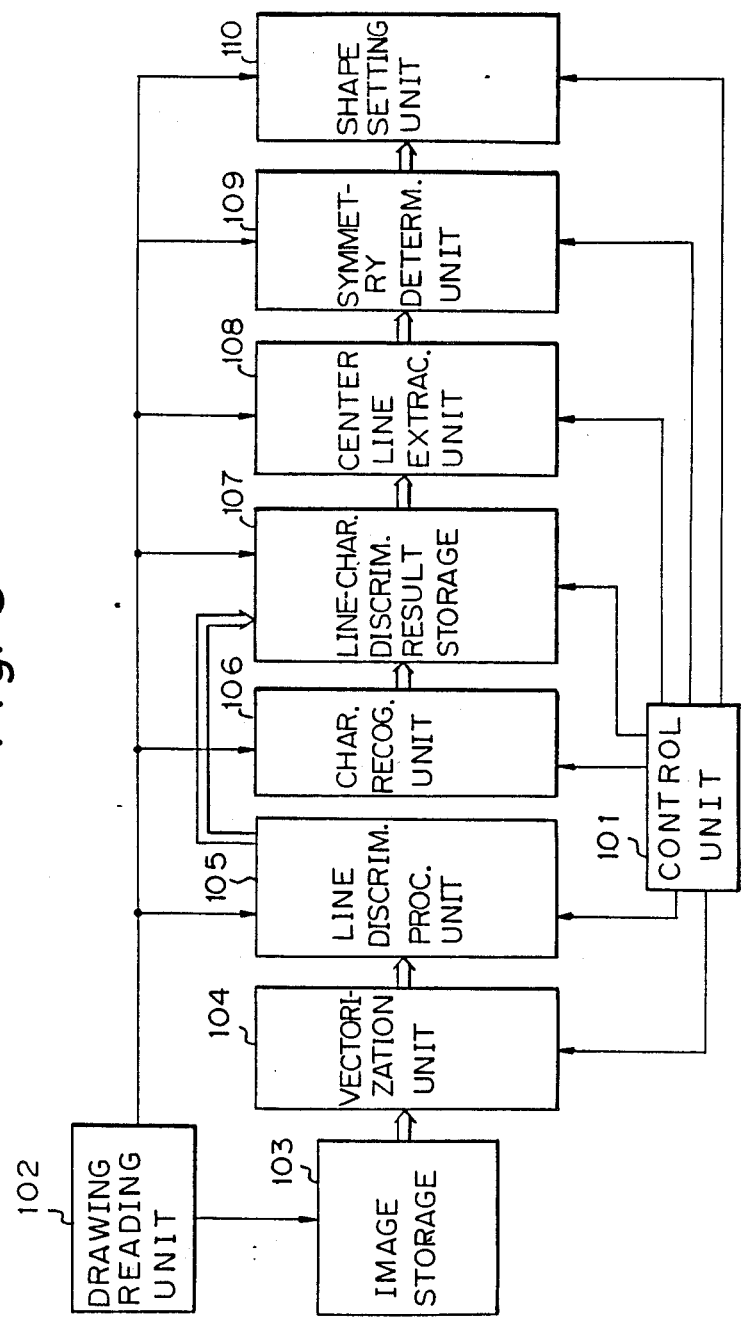
FIG. 3 shows a shape recognition apparatus for automatic drawing input according to an aspect of the present invention.
Figure 5A:
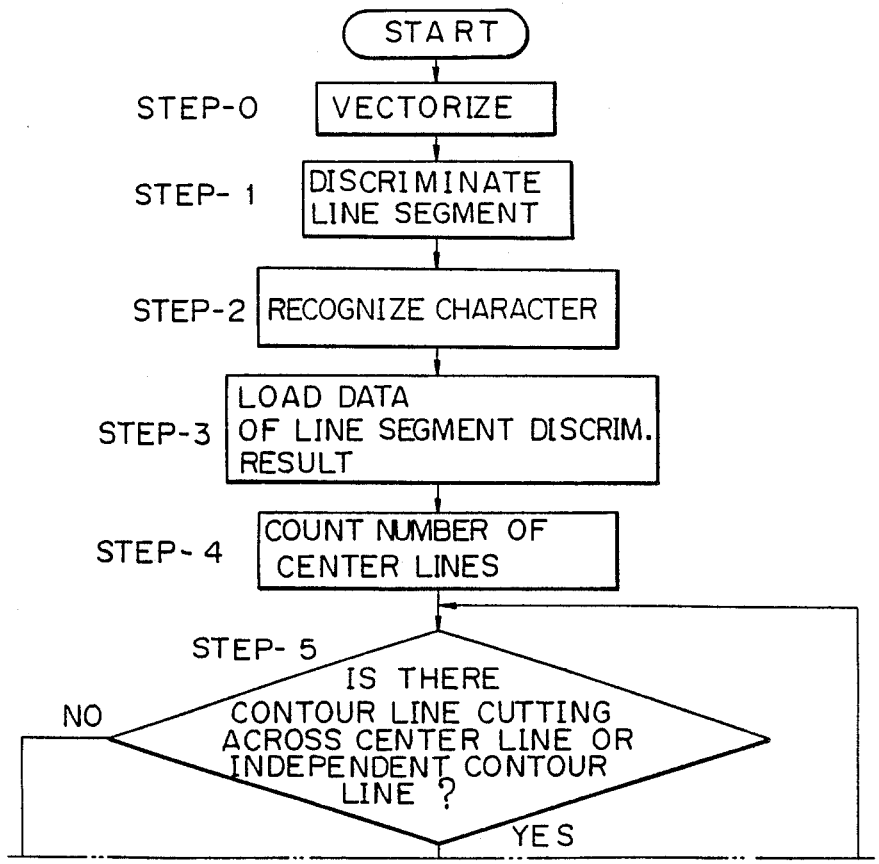
Figure 5B:
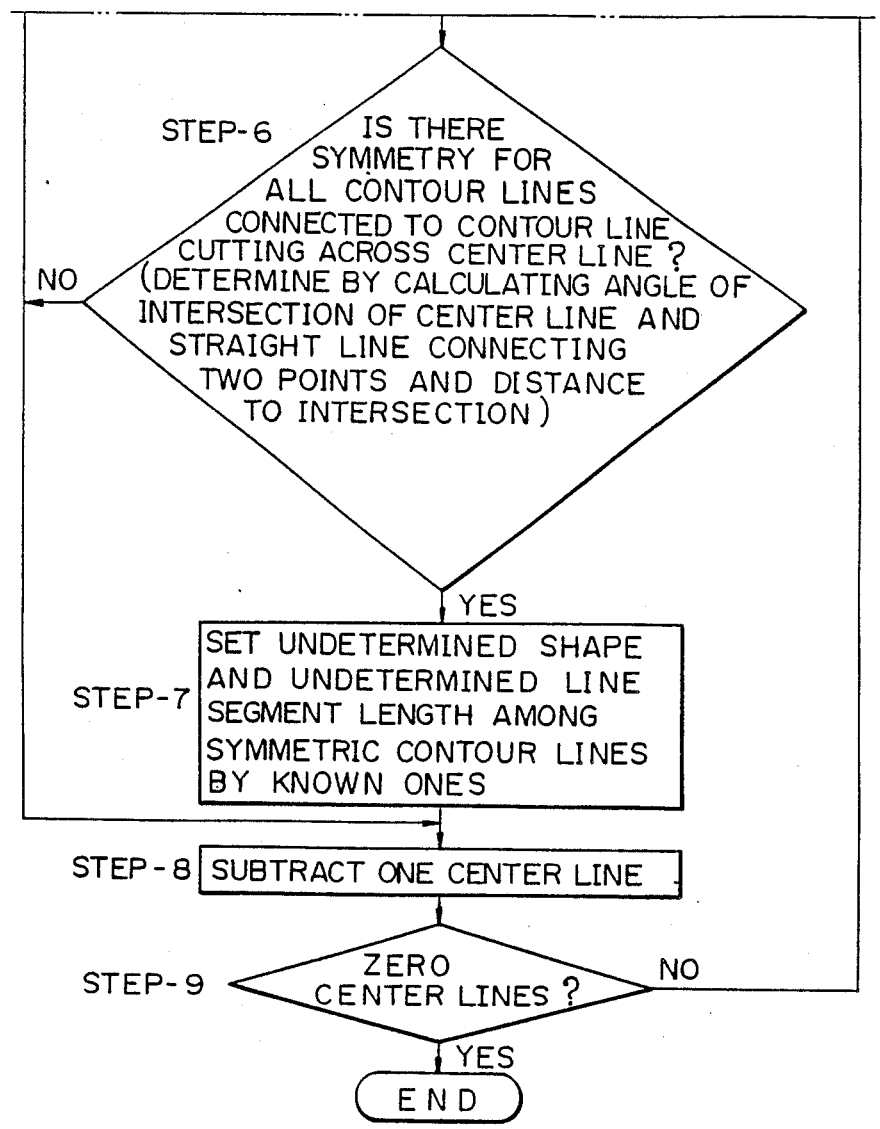

A recognition apparatus according to one embodiment of the present invention is shown in FIG. 3. FIG. 4 and FIG. 5 are used to aid understanding of the apparatus of FIG. 3.

The apparatus of FIG. 3 has a character recognition means 106 which recognizes characters indicating the type of the contour, the length of the contour lines, and the characters indicating the angles; a line segment discrimination processing means which classifies line segments based on definition information set for different line types; a centerline extraction means which extracts the centerline drawn at the center of a shape from the line segments classified by the line segment discrimination processing means 105; and means 109 and 110 which determine the extracted centerline, the intersection of the straight line connecting the end point positions of the contour line, the actual distance on the drawing between the end point positions of the said contour line, and the symmetry from the actual angle on the drawing made by the centerline and straight line.

The apparatus of FIG. 3 extracts the centerline of a drawing prepared by the simplified notation method to determine the symmetry of the shape and uses the characteristics of the symmetry to set the undetermined shape and length and position of line segments from the known shapes, line segments, and characters, and thus recognize the shape.

Figure 1:
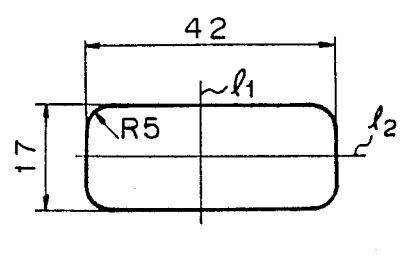
FIGS. 1 and 2 show examples of simplified indications of drawings utilizing symmetry of configuration in a projection.
Figure 2:
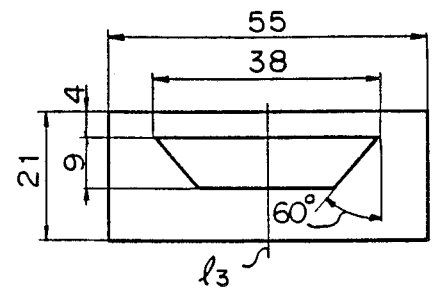

FIG. 1 shows an example of a shape with top-bottom and right-left symmetry about the centerlines $l_1$ and $l_2$. Although arcs exist at the four corners, an arc is indicated at only one of the corners. FIG. 2 shows an example of a shape with right-left symmetry about the centerline $l_3$. Although line segments exist with angles at two locations, the angle is indicated at only one of the locations.

In the case of the illustration shown in FIG. 1, the apparatus of FIG. 3 understands that the dimensions of the arc of the four corners are the same as the dimensions indicated at the one location and functions to determine the dimensions of the arcs at the three positions not indicated. In the case of the illustration shown in FIG. 2, the apparatus understands that the line segment where the angle indication is not given is the same as the line segment where the angle indication is given, and thus functions to determine the angle not shown. Further, in the case of FIG. 2, the apparatus functions to determine the position of the inside shape. With these and other functions, the apparatus determines the undetermined shapes and dimensions and positions of line segments using the simplified notation method based on symmetry. Below, an explanation will be made based on the illustrations shown in FIG. 1 and FIG. 2.

A control apparatus 101 in the apparatus of FIG. 3 performs a control process according to the flow chart shown in FIG. 5. In FIG. 3, the drawing reading unit 102 reads the drawing which the designer has prepared as image data, the image storage unit 103 stores the image data, and the vectorization unit 104 converts the image data into a vector (STEP-0). Next, the image data is supplied to a line segment discrimination processing unit 105 where, based on definition information set for each line type, the visible contour lines, hidden lines, dimension lines, extension lines, leaders, centerlines, and other line segments are classified and discriminated (STEP-1) and stored in the line segment and character discrimination result storage unit 107. At the same time, the character recognition unit 106 recognizes the dimensions, angles, radius R5, chamfering C7, and other character information indicating the type of shape and contour lines on the drawing (STEP-2) and stores the same in the line segment and character discrimination result storage unit 107.

Data is loaded from the line segment and character discrimination result storage unit 107 (STEP-3) and supplied to the centerline extraction unit 108. The loaded data includes line segment information discriminated for each afore-said attribute and dimensional information corresponding to the dimension lines. In the centerline extraction unit 108, the number of centerlines is counted as the basic line segments indicating the symmetry (STEP-4). The contour lines which possibly have symmetry, for example, visible contour lines and hidden lines, are investigated according to exactly the number of centerlines (STEP-5), and the symmetry judgment unit 109 judges whether these are symmetric contour lines.

The judgment is based on the following conditions: For example, in FIG. 4, PG is a contour line which is a candidate for symmetry, ML is a centerline, $\theta$ is the angle formed by the centerline ML and the contour line PG, T is the intersection between the centerline ML and the contour line PG, $L_1$ is the length of the line PT, and $L_2$ is the length of the line TG. Here, the angle $\theta$ and the lengths $L_1$ and $L_2$ are the actual angle and lengths on the drawing found by the drawing reading unit 2. As shown in FIG. 4, all the endpoint positions of the line segments connecting the contour line segments cutting across the centerline ML are found, the intersections T of the straight lines PG connecting the end points and the centerline ML and the angles $\theta$ are calculated, and the symmetry investigated under the conditions shown below:

$$|L_1 - L_2| < Th$$

$$\{(\pi/2 - \alpha) < \theta < \{(\pi/2) + \alpha\}$$

where, Th and α are respectively threshold values. If the above conditions are satisfied, the contour lines in the object studied are symmetrical.

When the judgment is that symmetry exists, in the next contour setting unit 110, a search is run for contour lines having symmetry which have undetermined lengths and positions of line segments and shapes. The dimensions, etc., are set by judging the characters recognized by the character recognition unit 106 and the known line segments and shapes for the shape recognition (STEP-7). Next, the number of centerlines is subtracted by one (STEP-8), then it is judged if the number of centerlines has become zero (STEP-9). The above processing is repeated a number of times corresponding to the number of centerlines for the symmetrical shape recognition.

In the apparatus of FIG. 3, the shape recognition apparatus used as the automatic drawing input system can use drawings drafted by the simplified notation method using symmetry. This enables a shortening of the time required for drafting drawings by designers and enables the merits of the automatic drawing input system to be exhibited to the fullest in initial information input processing in CAD systems.

((Description of Embodiment of FIG. 6))

Figure 6:
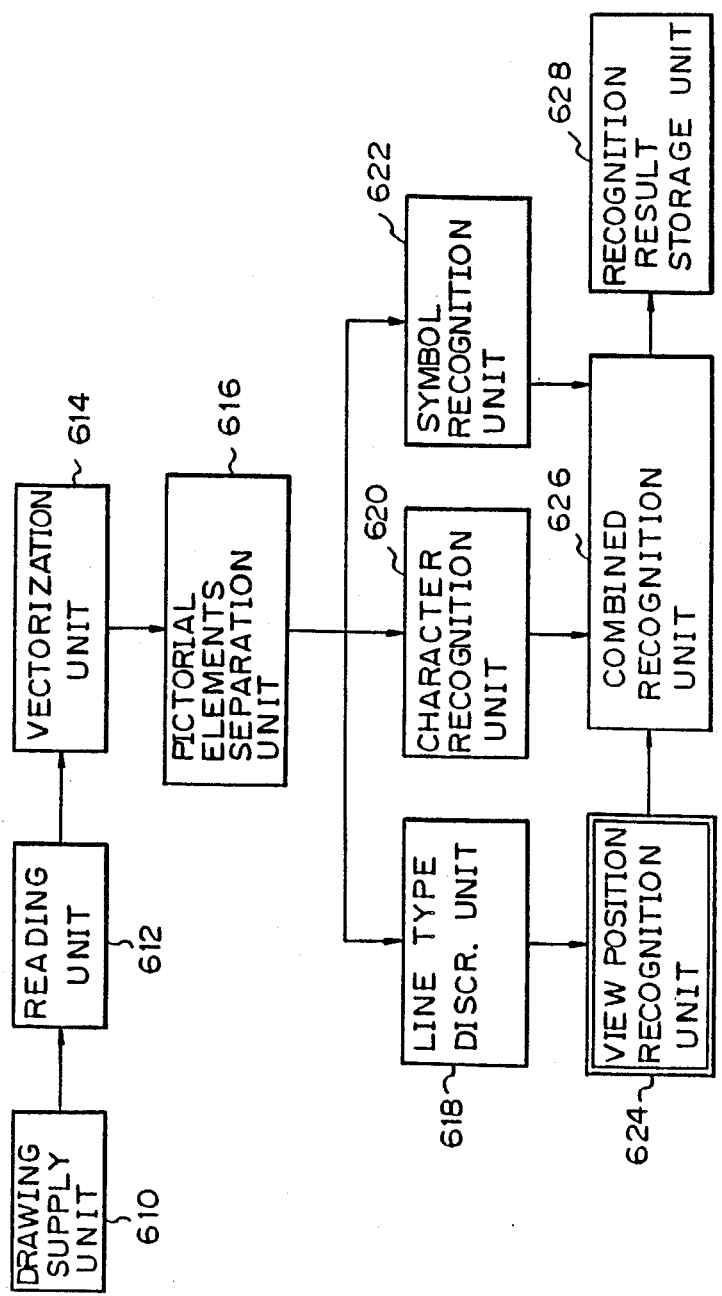
FIG. 6 shows a view recognition apparatus for automatic drawing input according to another aspect of the present invention.

FIG. 6 shows a recognition apparatus according to another embodiment of the present invention. FIGS. 7 to 14 are used to assist with the understanding of the apparatus of FIG. 6.

The apparatus of FIG. 6 is intended to aid the recognition of drawings drafted by developing objects into three-view drawings, such a machine drawings or structural drawings, by enabling an understanding of whether the drawings were prepared by the first-quadrant, third-quadrant, or other projection methods, or determination of the correspondence among the view from the positions of the views, and thereby enable a determination of which views are which.

Figure 7:
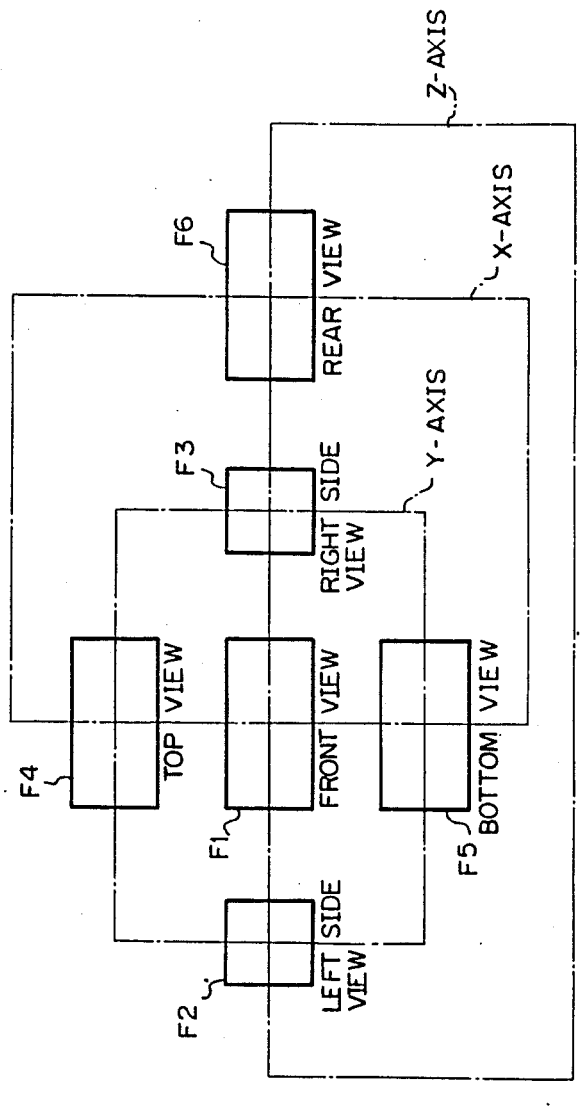
FIG. 7 illustrates a principle of the recognition of views in the apparatus of FIG. 6.

Assume that the drafting method based on the projection shown in FIG. 7 is registered as preliminary knowledge in the automatic drawing input apparatus. FIG. 7 shows the position of views in the third-quadrant method. The front view is a top view from above, a bottom view from below, a left side view from the left, and a right side view from the right. The rear view is placed to the right of the right side view. If all the views are drawn on a single sheet of paper by this rule, then it is possible to determine what view is shown without a written explanation of each view such as "front view" and "top view". This principle is used in the apparatus of FIG. 6,.

In the apparatus of FIG. 6, the drawings are read by scanners, television cameras, and other equipment and converted to binary value images to obtain 1,0 pattern data. This is stored in the memory and subjected to recognition processing to extract the characters, symbols, line segments, etc. The contour line data obtained by this type of recognition processing is grouped into lines having connecting relationships. The inclusion relationship of the groups is searched, considering block-like frames surrounding the grouped contour lines. Blocks which are not included in others, that is, contour line groups, are processed. The above-mentioned preregistered knowledge is used to determine, from the arrangement of the block regions, what blocks correspond to particular views.

In the apparatus of FIG. 6, a drawing 610 is read by a scanner, television camera, or other reading apparatus 612, the obtained binary value image data is converted into vectors (614), and the characters, symbols, line segments, and other drawing elements are extracted from the vectors (616). The recognition unit 620 recognizes particular characters and symbols from among these characters and symbols. While the line segments are recognized as visible contour lines, dimension lines, etc., it is not recognized if they are a top view of visible contour lines. Therefore, even if input, the data often cannot be used.

A view position recognition unit 624, which divides the illustrations on the drawing into views and recognizes particular views, is located after a line type discrimination unit 618. Reference numeral 626 is a combined recognition unit, which combines the recognition findings of the view positions, characters, and symbols and stores the combined recognition findings in a memory 628.

The view position recognition unit 624 processes contour lines, for example, visible contour lines and hidden lines, among the line types discriminated by the line type discrimination unit 618. In the case of a bent plate having a sectional view as in the right side view of FIG. 9, the front view and top view become as shown in FIG. 9. The broken lines are hidden lines and the solid lines are visible contour lines, and are subjected to recognition processing by the view type recognition unit 624.

The recognition unit 624 performs the grouping by determining the connecting relationship between the discriminated contour lines, and thus the lines are grouped into contour lines of net units having connecting relationships. In some cases, another group will be included in a group, so the inclusive relationship of the contour line groups is searched and the contour line groups which are not included in other groups are found. For example, in the above grouping, GROUP 1 to GROUP 6 of FIG. 8 are obtained. In the search for inclusive relationships, GROUP 4 to GROUP 6 are found to be groups included in GROUP 2, so GROUP 1 to GROUP 3 are determined as groups not included in other groups.

After the non-inclusive contour line groups are found, the number thereof is determined, i.e., one, two, three, or more.

The block frames surrounding the contour line groups are determined, the vertex coordinates of the block frame are found, and the ratios of coincidence of the block frames with other block frames in the horizontal and vertical directions is determined. A, B, and C of FIG. 10 are examples of the above-mentioned block frames. XW1 and YW1 and XW2 and YW2 are vertex coordinates of the block frames. If the X coordinates of the vertex coordinates of the block frames are arranged in rising order, the degree of coincidence in the X direction of the block frames can be obtained. If the Y coordinates are arranged in rising order, the degree of coincidence in the Y direction can be obtained. For example, if the X coordinates of the vertex coordinates of the block frames A and B in FIG. 10 are arranged in rising order, $X_1$ (XW3) $X_2$ (XW1) $X_3$ (XW4) $X_4$ (XW2) is obtained. The degree of coincidence $U_n$ may be found by the following equation:

$$U_n = (X_3 - X_2)/(X_4 - X_1)$$

As is clear from this equation, $U_n=1$, when $X_1=X_2$ and $X_3=X_4$ because of coincidence. When completely non-coincident, $U_n \overline{\leq} 0$. The normal drawings are drawn to match in the X, Y, and Z directions, for example, the front view and the top view match in the X direction with no deviation in usual cases. However, errors sometimes occur. If this is considered, then in the case where the deviation is slight, the coincidence may be considered. Therefore, the degree of coincidence $U_n$ is determined by the following conditions, to determine whether the drawings are normal:

If $U_n > Th$, there is coincidence and, therefore, the drawings may be considered normal, If $U_n \leq Th$, there is no coincidence and, therefore, the drawings are not normal.

In these conditions, Th is the threshold value. When determining drawings are not normal, the smaller block frame is eliminated. Drawings include, in addition to normal drawings, perspective views, sectional views, and other supplementary views. These have a low degree of coincidence and, therefore, may be eliminated by $U_n \leq Th$.

Figures 11, 12:
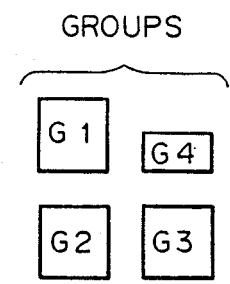
FIGS. 11 and 12 illustrate the groups of contour lines and a table representing the relationship between views.

The positional relationship of the so-judged views, that is, the contour line groups, is registered in a table. FIG. 12 shows an example of this registration. FIG. 11 shows the contour line groups which form the basis for the table. As shown in FIG. 11, G2 is below the contour line group G1 and G4 to the right thereof. The degree of coincidence of the right G4 is low, that is, $U_n < Th$, and thus is marked with an asterisk in the table of FIG. 12. Further, G1 is above the contour line group G2 and G3 to the right thereof. These lines are coincident, and thus are stored as shown in the table in FIG. 12. The same hold true for the other groups. For contour line groups which are not included in other groups but are determined to have top, bottom, left, and right degrees of coincidence suitable for normal views, serial numbers are given as shown in FIG. 12 and registered.

Figure 14:
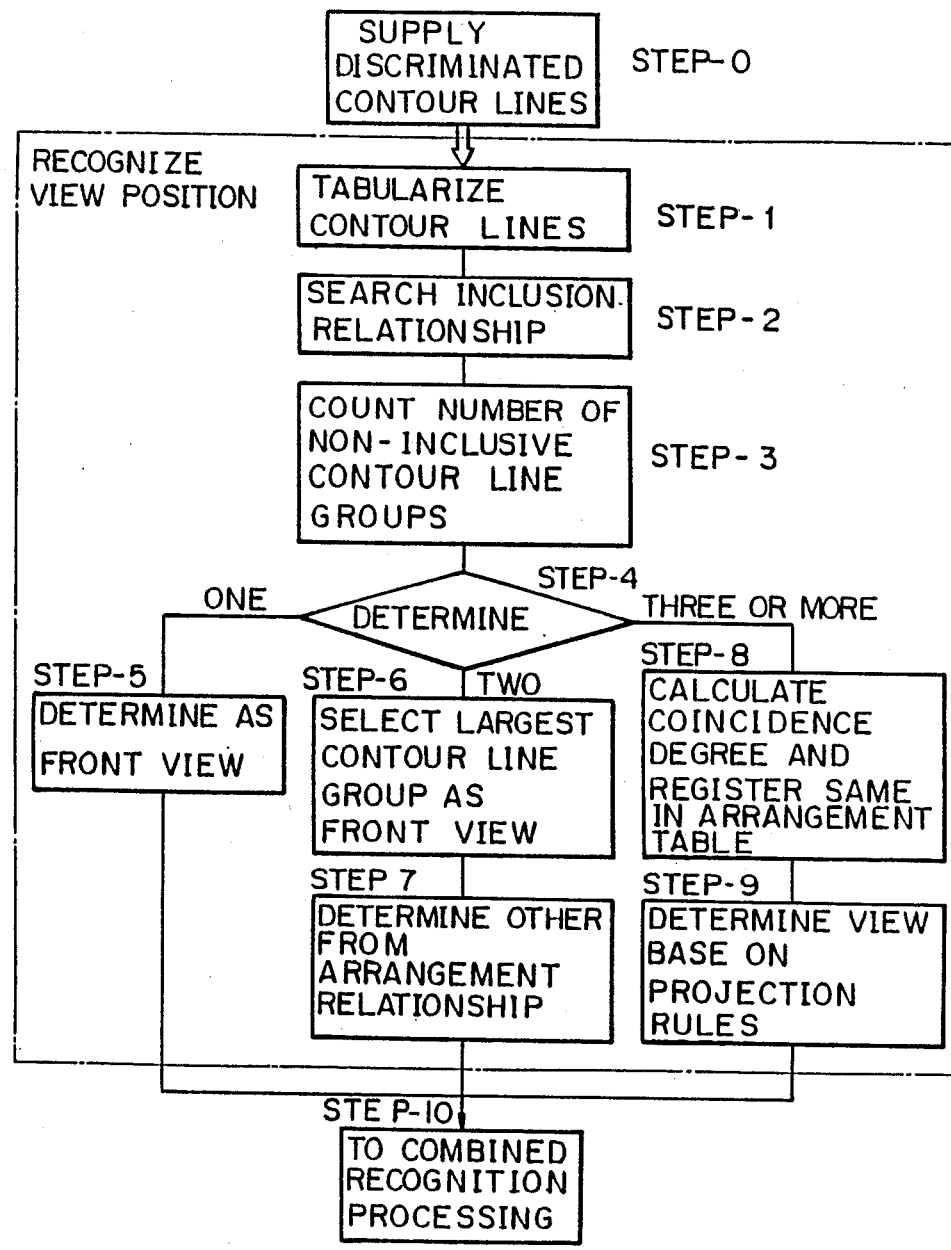
FIG. 14 is a flow chart of the operation of the apparatus of FIG. 6.

When the table is completed, it is determined which views are which with reference to the preregistered rules of projection. FIG. 14 is a flow chart of the above processing and view determination regions.

As shown by the flow chart of FIG. 14, first, when there is only one contour line group not included in any other groups, this is determined as the front view. That is, when there is only one view, that view is arbitrarily deemed the front view.

Second, when there are two contour line groups not included in other groups, the larger group is considered the front view and the view of the smaller group is determined from the positional relationship thereto. For example, if above, it is determined to be a top view, and if to the left or right, it is determined to be a left side view or right side view. When the two groups are almost the same in size, the left group is considered the front view. The calculation of the above degree of coincidence $U_n$ is performed when there are three or more groups, the above-mentioned table is prepared, and particular groups belonging to particular views are determined from the table and the projection rules as shown in FIG. 13.

FIG. 13 shows the projection rules. The circle marks denote that other views may exist, the X mark denotes that other views may not exist, and the asterisk mark denotes "don't care".

For example, in the case of the table of FIG. 12, G2 is determined to be the front view, G1 the top view, G3 the right side view, and G4 a supplementary view. Note that G2 has other contour line groups to the top and right, and G3 has other contour line groups to the left and top. As clear from FIG. 7, these all meet the requirements for front views, but in this case, the bottom left one is selected. When the views are determined in this way, the results are sent on to the combined recognition unit.

At the combined recognition unit 626, the character recognition results, the symbol recognition results, and the view recognition results are combined for an overall recognition. When view recognition results are obtained, dimensions which are not given also can be calculated. For example, when the horizontal length $l_1$ and the vertical length $l_2$ of the top view in FIG. 9 are given, they are known by the character recognition. The horizontal length $x_1$ of the front view, however, is often omitted as it is the same as the horizontal length $l_1$ of the top view. In the combined recognition unit 626, $l_1$ is adopted for $x_1$, the horizontal length $x_1$ of the front view is considered $l_1$, and this is stored in the recognition result storage apparatus 628. Such processing is not possible if particular views are not known. The frames marked by X, Y, and Z in FIG. 7 show that the groups of views having a common X axis are the top view, front view, bottom view, and rear view, the views having a common Y axis are the top view, left side view, bottom view, and right side view, and the views having a common Z axis are the left side view, front view, right side view, and back view. Using this relationship, it is possible to calculate the omitted dimensions.

((Description of Embodiment of FIG. 15))

Figures 15, 15A:
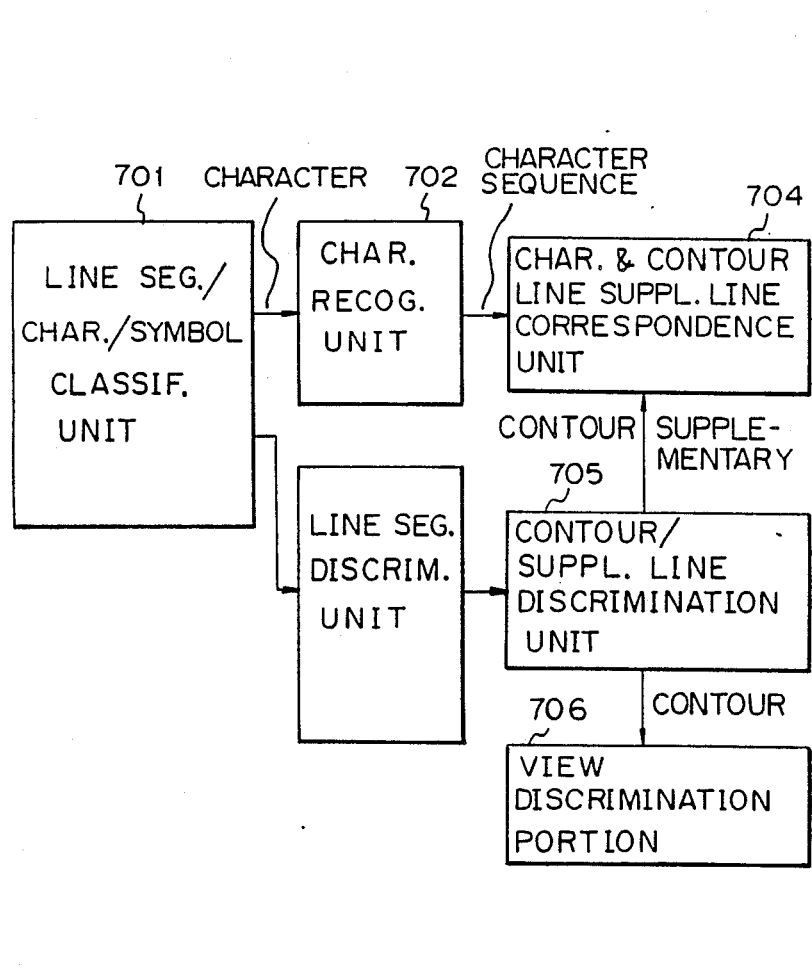
FIGS. 15, 15A and 15B show a shape recognition apparatus for automatic drawing input according to still another aspect of the present invention.
Figure 15B:
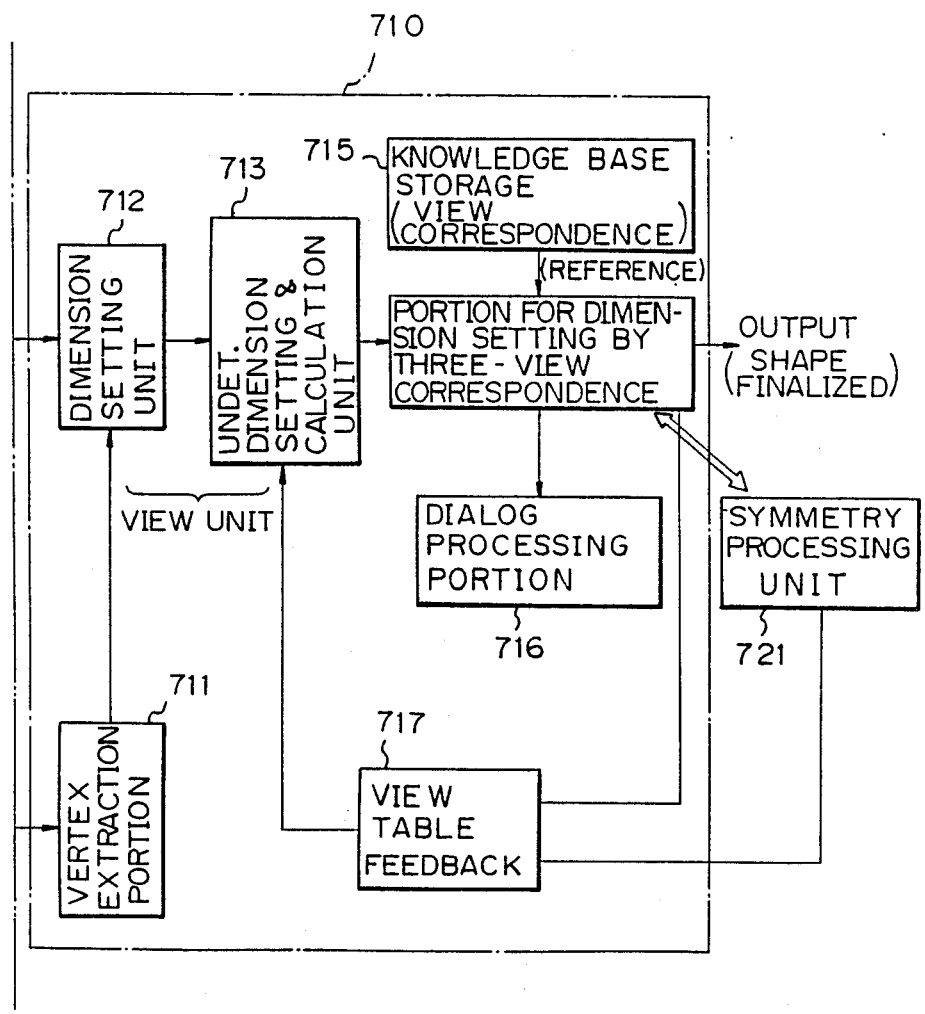
Figure 16:
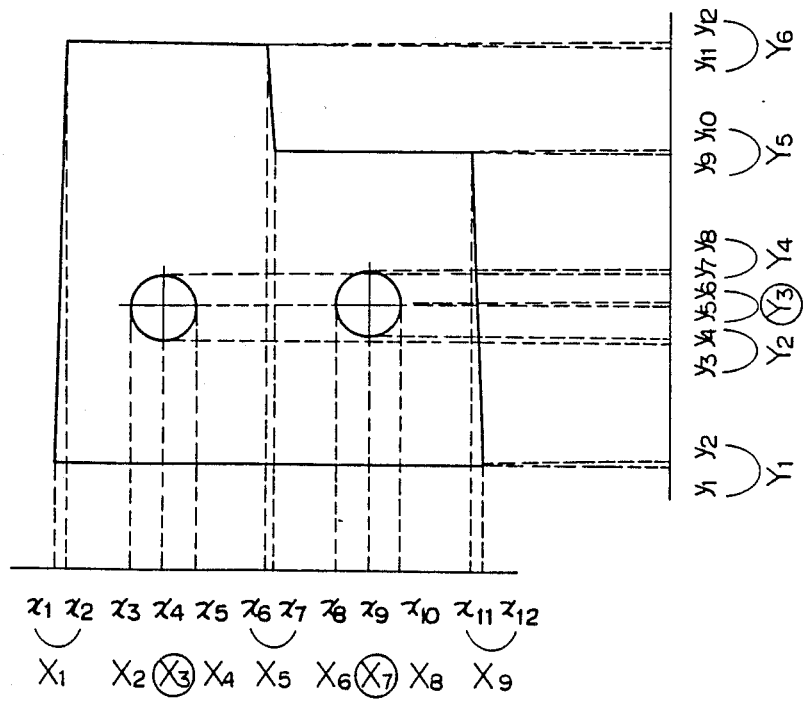
FIG. 16 illustrates a process for obtaining vertexes.
Figure 17:
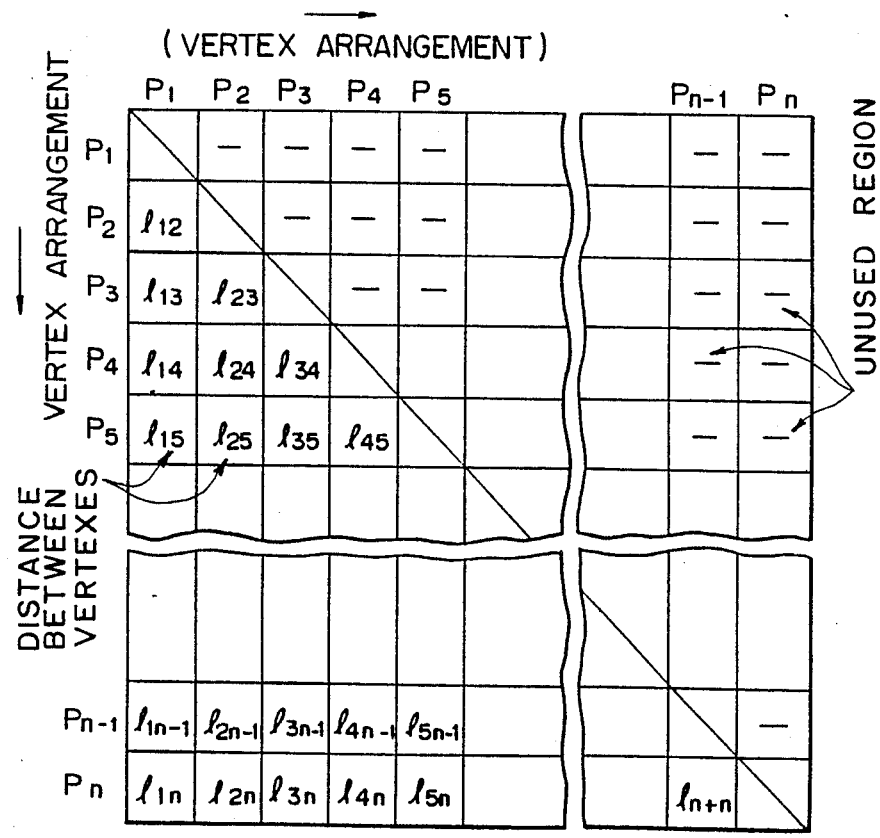
FIG. 17 shows a table representing vertex data.
Figure 18:
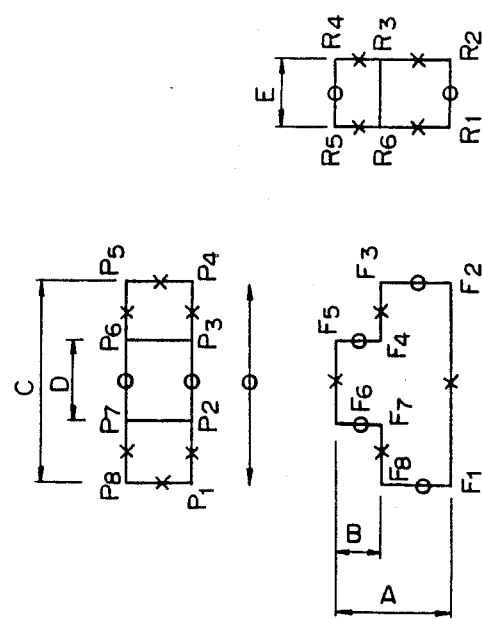
Figure 19:
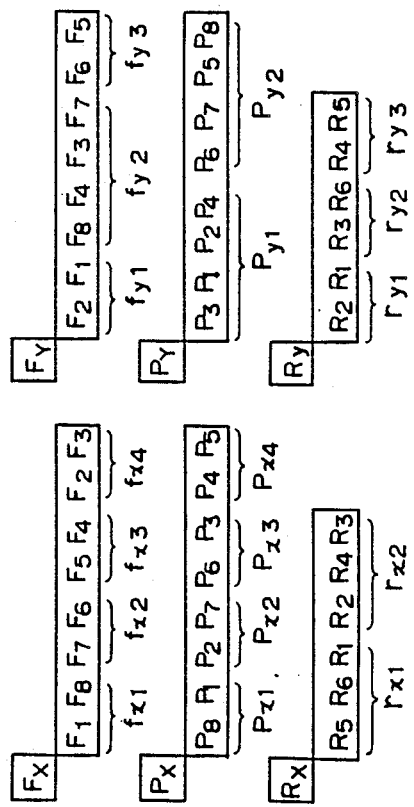

FIG. 15 shows a recognition apparatus according to another embodiment of the present invention. FIGS. 16 to 28 are used to aid the understanding of the apparatus of FIG. 15.

Figure 28:
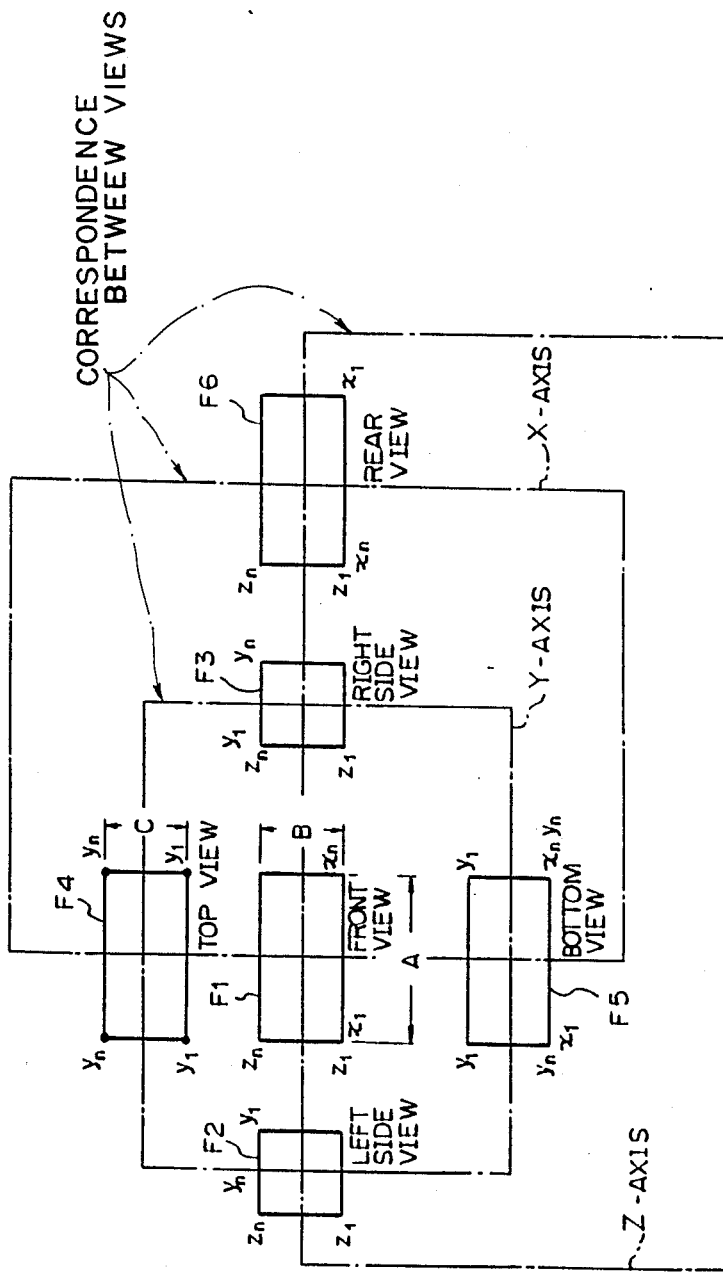
FIG. 28 illustrates a principle of the recognition of the relationship between type views used in the apparatus of FIG. 15.

FIG. 28 shows contour views of an object from different directions by a third-quadrant projection. For example, to the right of the front view F1 is drawn a view of the object as seen from the right, as a right side view F3. Further, at the top of the front view F1 is drawn, as a top view F4, a view of the object as seen from the top. In the first quadrant method, conversely from the third-quadrant method, the left side view is drawn to the right of the front view and the bottom view is drawn at the top of the front view. The English characters A and B marked in the front view F1 and C, etc., marked in the top view F4 indicate dimensions. That is, the drawings, when viewed from the front, show a cubic object with a horizontal length of Z, a height of B, and a depth of C.

In the drawings shown in FIG. 28, the only indications of the shape dimensions are the horizontal length dimension A and height dimension B in the front view and the depth dimension C in the top view, but when viewed by users, it is easy to discover the dimensions of other parts from the correspondence among the views and the shapes can be easily envisioned.

However, when the drawings are viewed in units of single views, it is not possible to immediately discover the dimensions from the views.

Conventional shape recognition apparatuses, as mentioned earlier, only deal with single views in recognizing drawings prepared by the first quadrant, third quadrant, and other projection methods used for drafting machine drawings or structural drawings. In other words, they treat drawings of two-views or more in the same way as single-view drawings and do not consider the projection method at all during recognition. Most machine drawings and structural drawings are drawn in three views by the third-quadrant method, and thus most of these design drawings cannot be handled by conventional drawing recognition apparatuses. Further, since no consideration is given to preparation by the projection method during recognition and processing, the obtained design information represents only a portion of the whole, placing too great a load on the CAD system.

In consideration of this problem in the prior art, the apparatus of FIG. 15 is intended as a recognition apparatus for drawings prepared by developing the shape of an object into three views, as with machine drawings and structural drawings, wherein the method of drafting, such as the first quadrant, third quadrant, or other projection method, is understood by a predetermined system of marking used at the preparation of the drawings, to enable shape recognition, and the dimensions of contours not directly indicated are set by reference to the correspondence among the views, thus enabling a final determination of the shape.

The apparatus of FIG. 15 recognizes the drawings from the image data on the drawings prepared by developing the shape of machines or structures by the projection method, and includes means for classifying the line segments and characters in the image data, recognizing characters, and discriminating the types of line segments to determine whether they are contour lines or supplementary lines; means for finding the correspondence among the recognized character information and the contour lines or supplementary lines; means for classifying the contour lines by view, finding the position on the illustration of the view, and finding the vertex of the same; means for giving a length value to contour lines corresponding to portions for which the dimensions are indicated in the drawings and for calculating the length of contour lines of portions for which dimensions are not indicated from known dimensional values; and means for giving to contour lines a length value from a dimensional value known in other views or a value calculated based on said dimensional value.

The apparatus of FIG. 15 includes a line segment/symbol classification unit 701, a character recognition unit 702, a line segment discrimination unit 703, a character and contour line/supplementary line correspondence unit 704, a contour line/supplementary line discrimination unit 705, a view discrimination unit 706, a vertex extraction unit 711, a dimension setting unit 712, an undetermined dimension setting and calculating unit 713, a dimension setting unit 714 using the correspondence among the three views, a knowledge base (production rule) storage unit 715, a dialog processing unit 716, a drawing table feedback unit 717, and a symmetry processing unit 721. In FIG. 15, the portion surrounded by the dot-chain line is the processing unit 710.

The data received by the processing unit 710 includes character sequences, that is, indicated dimensions, and corresponding contour line/supplementary line data obtained by the processing of the character and contour line/supplementary line correspondence unit 704; data on contour lines grouped in net units by connecting relationships by the contour line/supplementary line discrimination unit 705 and the view discrimination unit 706; and data on the view positions, that is, front view, top view, etc., of the groups.

First, the vertex extraction unit 711 extracts the vertexes by projection for each view on the X axis and Y axis from the endpoint coordinates of the contour lines as shown in FIG. 21. In this case, coordinates of the vertexes which are close to each other are merged into single vertexes.

Figure 23:
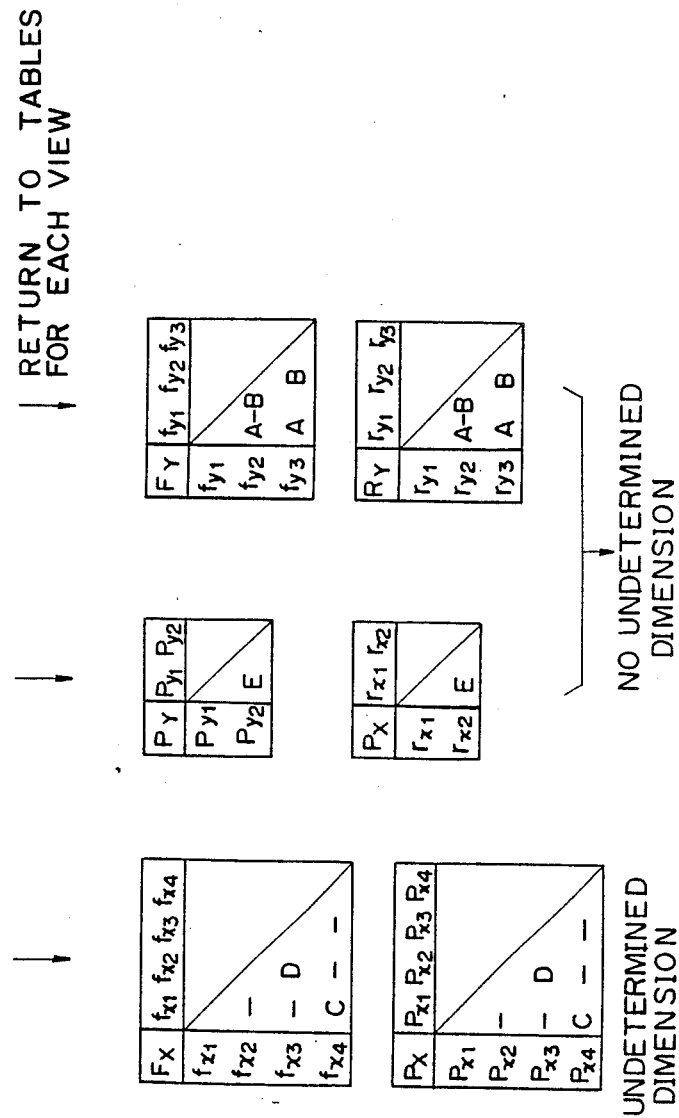
Figure 24:
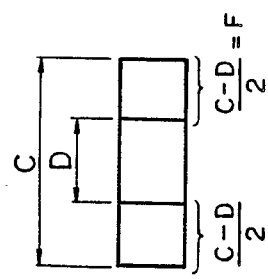
Figure 25:
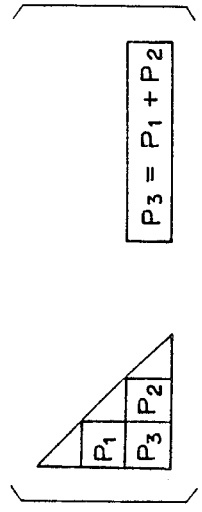
Figure 26:
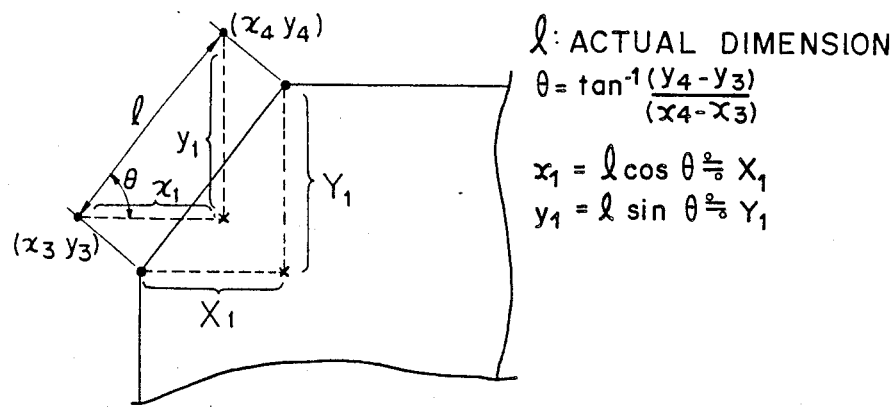
FIGS. 26 and 27 illustrate principles of obtaining a dimension between apexes.
Figure 27:
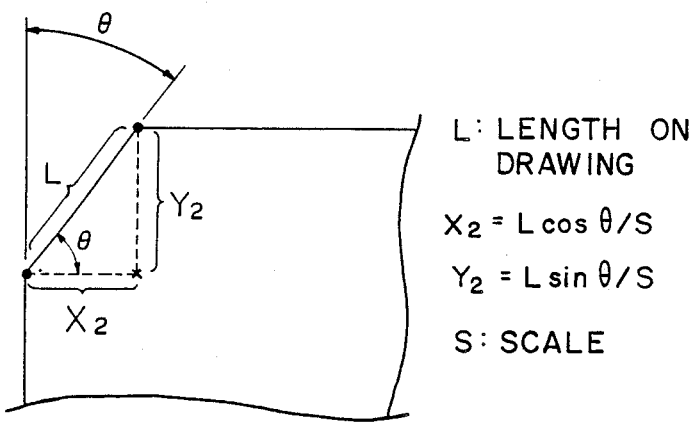

Next, the dimension setting unit 712 prepares a two-dimensional matrix table, as shown in FIG. 22, having the number of vertex positions on the X axis and Y axis. Then, using the dimensional values, that is, distances, and corresponding contour line/supplementary line data obtained by the character and contour line/supplementary line correspondence unit 704, dimensional values are set for the corresponding vertex intervals. Here, only the distances of the vertex intervals with dimension line indications are set. The distance settings of the vertex intervals are found from the horizontal dimensions, the vertical dimensions, and the dimensions of slants as shown by FIG. 23, the dimensions of angles shown by FIG. 24, and other values indicated by the character information. In the example of FIG. 24, consideration is given to the scale. The other horizontal/vertical dimensions and the circular and arc dimensions are similarly calculated, the distances of the vertex intervals sought, and the results set in the two-dimensional table as shown in FIG. 22. Next, in the processing by the undetermined dimension setting and calculation unit 713, the two X and Y tables are received for each drawing and the locations with undetermined dimensions are calculated by the following two relations from the dimensional values received:

$$l_{(m,a)} = l_{(m,m+1)} + l_{(m+1,a)}$$

where
$a = m+2, m+3, \ldots, N-1$
$1 \leq m < N-2$ $$l_{(\beta,n)} = l_{n-1,n)} + l_{(\beta,n-1)}$$

where
$\beta = n-2, n-3, \ldots, 1$
$3 < n < N$

FIGS. 18 to 25 show the processing flow. In the processing up to this point, a table is obtained wherein dimensional values are found within the scope of the individual views as shown in FIG. 20.

The undetermined dimension setting and calculation unit 713 of FIG. 15 refers to the correspondence among views stored in the knowledge base storage unit 715 from the dimension setting table obtained for each view, confirms the correspondence as shown in FIG. 21 by the vertexes of the corresponding views, and prepares three dimension setting tables for the X, Y, and Z axes as shown in FIG. 22. Then, the same processing as in the undetermined dimension setting and calculation unit 713 is performed for the three tables Tx, Ty, and Tz. If undetermined dimensions still exist in the processing up this point, the symmetry processing unit 721 of FIG. 15 performs the symmetry processing as shown by the example in FIG. 24, to eliminate the undetermined dimensions. When it is impossible to set the distance of the contour line segments due to mistakes in the dimensional values on the drawings initially prepared, and thus undetermined dimensions remain, the dialog processing unit 712 is questioned, the correct dimensional values are instructed, and thus the shape is finalized.

In the apparatus of FIG. 15, in the recognition of machine drawings, structural drawings, and other design drawings prepared by the projection method, recognition of those design drawings among the entire views in which the dimensional values are not indicated enables a final determination of the length and size of the contour lines of the views where the dimensional values are not indicated, and enables the acquisition of drawing information which could not be obtained by conventional recognition apparatuses. This enables an extraction of almost all drawing information written in the design drawings, and thus is advantageous in making possible a massive reduction in the work of adding insufficient information, etc., in the succeeding CAD system.

((Description of Embodiment of FIG. 29))

Figure 29:
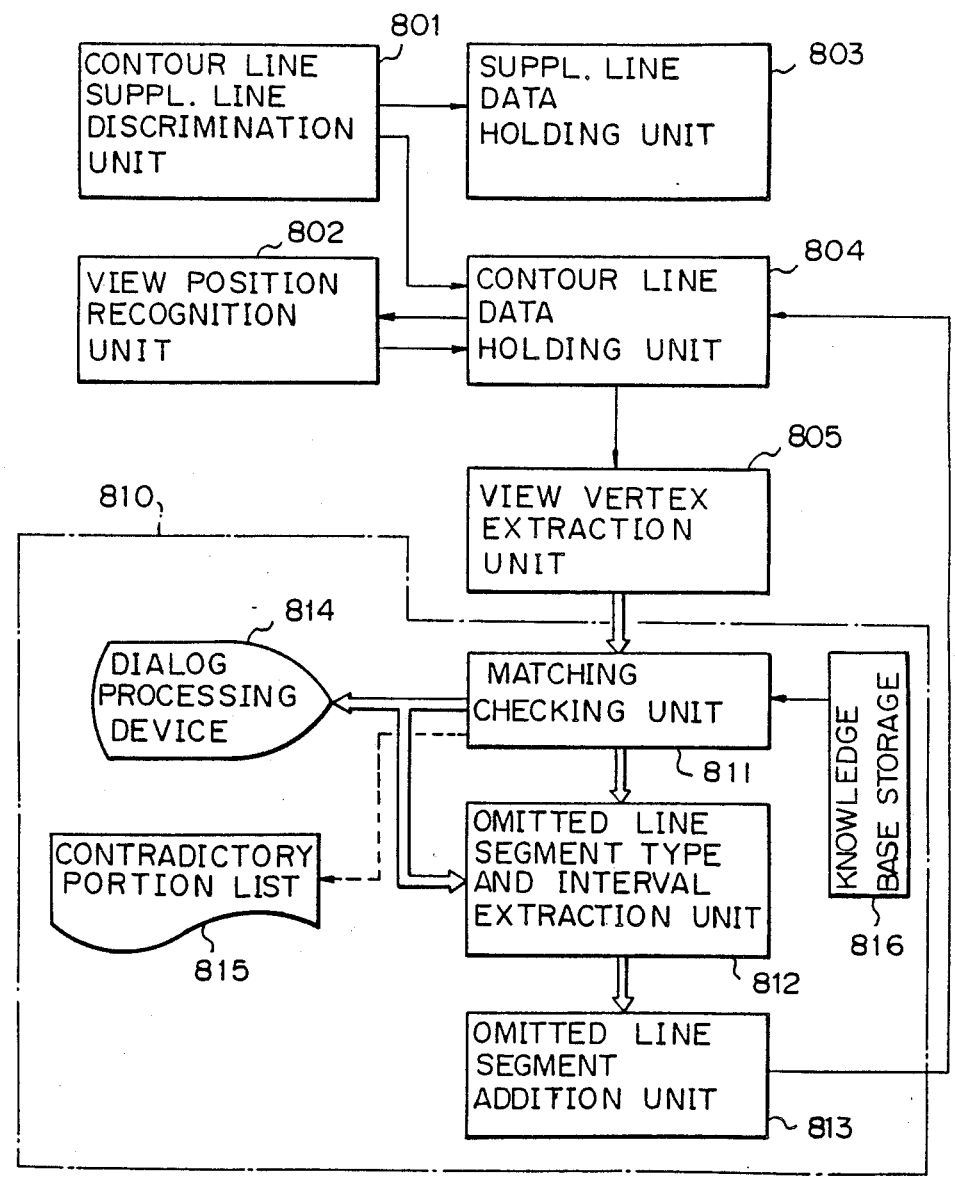
FIG. 29 shows a configuration recognition apparatus for automatic drawing input according to a further aspect of the present invention.

FIG. 29 shows a recognition apparatus according to another embodiment of the present invention. FIGS. 30 to 40 are used to aid an understanding of the apparatus of FIG. 29.

In general, machine drawings and drawings of structures are prepared by the first-quadrant, third-quadrant, or other projection methods.

FIG. 7, mentioned before, shows the relationship among views in the case of drawings prepared by the third-quadrant method. F1 indicates the front view, F2 the left side view, F3 the right side view, F4 the top view, F5 the bottom view, and F6 the rear view. Note that, in FIG. 17, the X axis, Y axis, and Z axis are shown.

That is, as shown in FIG. 7, in the contour views of the various directions resulting from third-quadrant projection of an object, the front view F1 has drawn on its right a right side view F3 showing the view of the object from the right. Further, the front view F1 has a top view F4 drawn above showing the object as seen from above. In the first-quadrant method, conversely to the third-quadrant method, on the right of the front view is the left side view and above is the bottom view.

Figure 39:
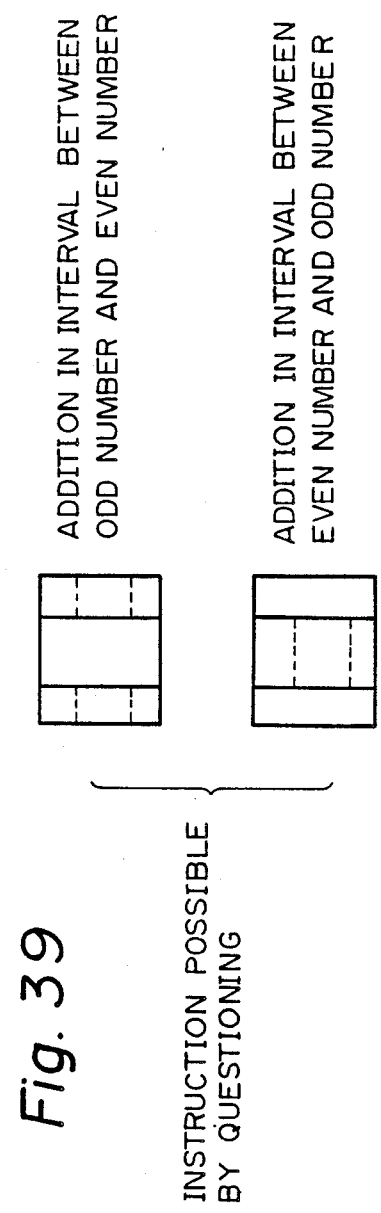

FIG. 39 explains the indications of the drawings by the third-quadrant method. The object of the shape shown in the left figure when expressed in perspective, when seen from the arrow direction of DIRECTION-A of FIG. 39, gives a view (front view) as shown in the center. The right side view becomes as shown at the right. At this time, the plane shown by PLANE-2 in the right figure is expressed in the center figure by broken lines as shown by PLANE-1, as hidden lines.

In drawings prepared by the first-quadrant, third-quadrant, and other projection methods used for preparing machine drawings and structural drawings, when workers can intuitively understand detail, an addition of the same conversely makes things too complicated and hard for people to understand. In such cases, the line segments indicating shapes are often omitted.

Figure 40:
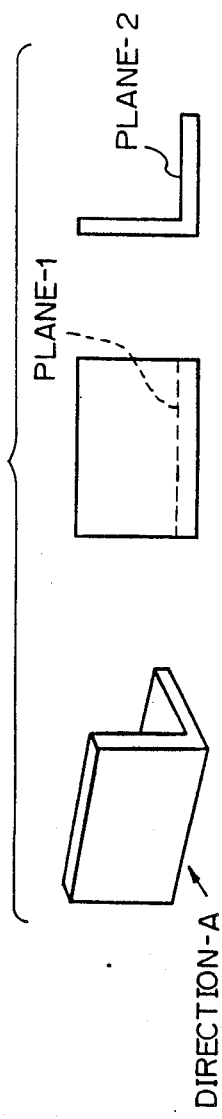
FIG. 40 shows a representation of a drawing by the third-quadrant projection method.
Figure 41:
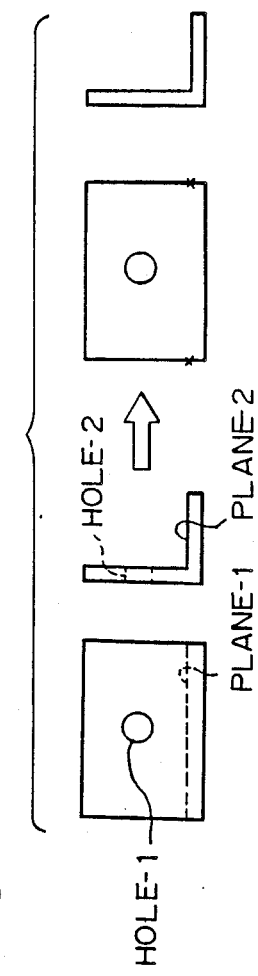
FIG. 41 shows non-indication of line segments in drawings.

FIG. 40 explains such an example of an omission of line segments. The hole HOLE-1 seen in the front view is indicated by broken lines such as the HOLE-2 in the right side view. On the other hand, the plane shown by PLANE-2 in the right side view is correctly shown by the broken line PLANE-1 in the front view. However, the broken line PLANE-1 is often omitted in the front view, and the broken line HOLE-2 tends to be omitted in the right side view.

Drawings with such omissions could not be handled in prior art drawing recognition. Therefore, the drawing information obtained by conventional drawing recognition apparatuses became only a small part of the whole design information and too great a load was imposed by the work of adding omitted line segments in the subsequent CAD system. Further, designers occasionally make errors when preparing drawings, and these could not be handled by conventional drawing recognition. The kind of result that would be recognized and output would be unknown, and thus there is a defect in the reliability of the process.

In consideration of these problems in the prior art, the apparatus of FIG. 29 is designed as a recognition apparatus for drawings prepared by developing the shape of an object into three views, as with machine drawings or structural drawings, and using the simplified notation system, wherein the method of drafting, such as the first quadrant, third quadrant, or other projection method, is understood by a predetermined system of marking used at the preparation of the drawings for enabling shape recognition, the positions of the views are recognized, and a matching check is run while obtaining the correspondence among the views, thereby pointing out locations where contradictions have occurred due to errors in drafting and lightening the work load in the succeeding CAD system, and wherein, further, the position and types of the omitted line segments are recognized, thereby enabling acquisition of complete drawing information, including the omitted line segments.

The apparatus of FIG. 29 recognizes drawings from image data on drawings prepared by a development of the shapes of machines or structures by the projection method, and has a means for discriminating contour lines and supplementary lines of drawings, a means for recognizing the positional relationship among adjoining views, a means for confirming the endpoint coordinates of a contour line on the X axis and Y axis for each view and finding the vertex positions, a matching check unit for referring to the knowledge base in which the correspondence among views determined by the projection method is given rules, and inspecting the matching of views by the correspondence of the positions of the confirmed vertexes and number of vertexes for each view to detect contradictory positions, and a line segment generation unit for determining the types of line segments which should be added for views having vertexes which do not satisfy the conditions of correspondence, when contradictory positions are detected by the above matching check unit, and for generating and adding the same.

In the apparatus of FIG. 29, the method of drafting by the projection shown in FIG. 7 is registered in advance as knowledge. The contour line data obtained by the usual recognition processing shape is subjected to a matching test wherein the end points of the contour line segments are found as vertexes for each view and the coordinates of the vertexes are confirmed for the X axis and Y axis to obtain the correspondence among views. Next, as a result of the matching, if excess or insufficient vertexes exist among the corresponding views, notification is made of contradictory positions. The type of omitted line segment is determined by the view having the most vertexes, while the omitted line segment is added to the view with the least vertexes, and accordingly, the problems in the prior art are overcome.

In the apparatus of FIG. 29, the contour line and supplementary line discrimination means 801 receives, from the prior processing stage, information discriminated by the types of line segments, e.g., visible contour lines, dimension lines, hidden lines, and leaders, discriminates the contour lines, e.g., visible contour lines and hidden lines, and supplementary lines, e.g., dimension lines, leaders, and extension lines, and stores the same in the supplementary line data holding unit 803 and the contour data holding unit 804.

The drawing position recognition means 802 groups the contour line data of the contour line data holding unit 804 per unit of net to be connected, then recognizes the view position for each group, and stores the result in the contour line data holding unit 804.

Figure 30:
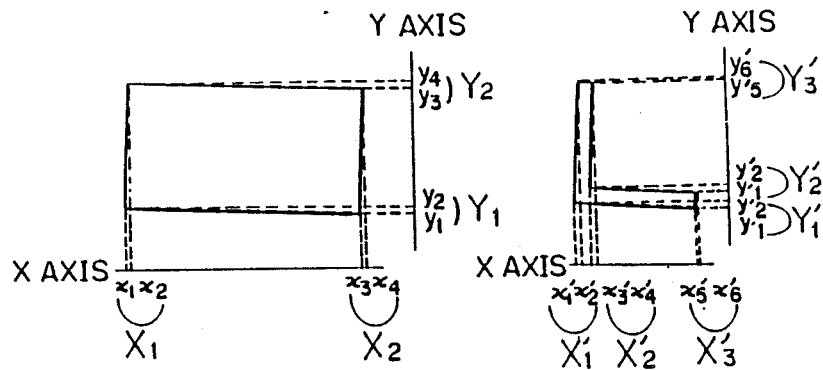
FIG. 30 illustrates a principle of confirmation of vertexes.
Figure 31:
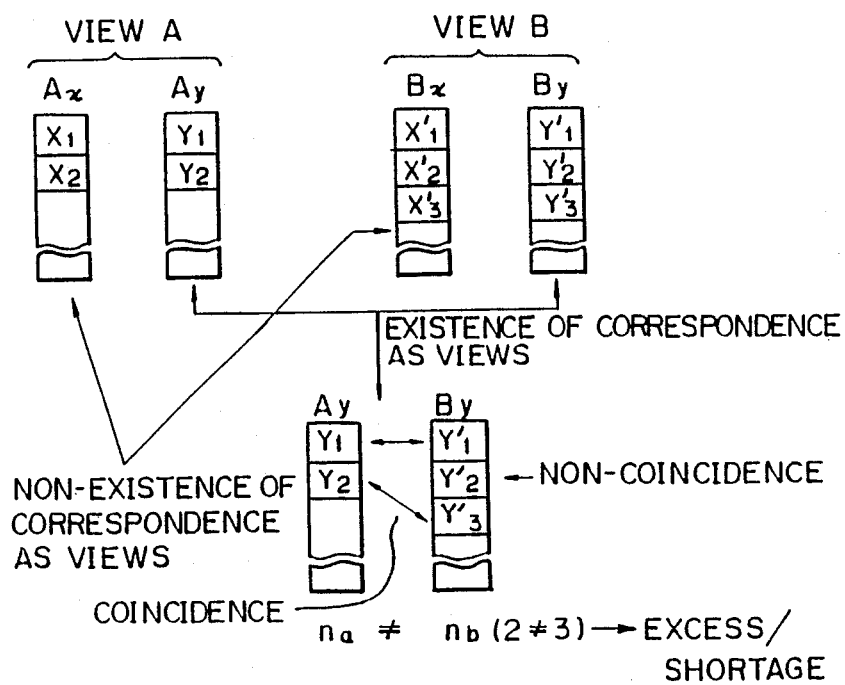
FIG. 31 illustrates a process of a checking of matching.
Figure 32:
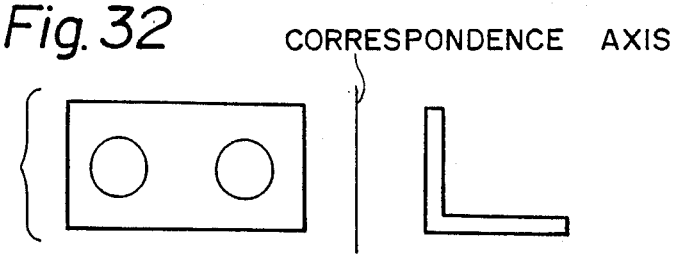
FIGS. 32 to 35 show processes of recognition of types of line segments to be added.

The drawing vertex extraction unit 805 receives the data on the contour line elucidated by the view position from the contour line data holding unit 804, then, as shown by FIG. 30, divides the end point coordinates of the contour lines for each view into those of the X axis and Y axis, merges nearby coordinates as a single vertex coordinate, and finds the vertex positions and number of vertexes. In FIG. 29, the portion enclosed by the dot-chain line indicates the processing unit 810. The matching check unit 811 uses the correspondence among the views due to the projection method shown in FIG. 7 and checks the vertex information found by the view vertex extraction unit 805 as shown in FIG. 31. A knowledge base 816 is connected to the matching check unit 811. The example of FIG. 31 shows the case where the correspondence relationship stands with the Y axis of view A and the Y axis of view B. In this example, the number of vertexes of the Y axis of view A is $n^a$ and the number of vertexes of the Y axis of view B is $n^b$. $n^a$ and $n^b$ are not equal and there is no matching. Further, when the matching of the vertex positions is checked, the vertex of $Y'^2$ of view B does not match, so a contradiction is shown. When such a contradictory position is found, it is output to the FIG. 29 dialog processing unit 814 or the contradictory position list 815 for notification.

The omitted line segment type and interval extraction unit 812 for the case of FIG. 29, and the omitted line segment addition unit 813, perform processing in the case where there are instructions for omitted line segment addition.

Figure 33:
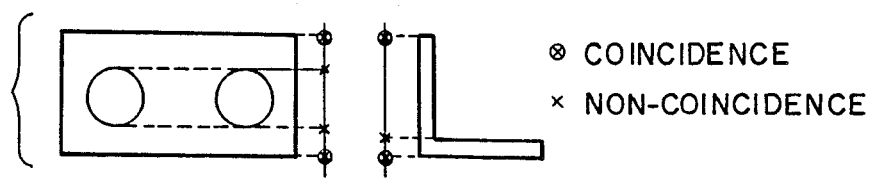
Figure 34:
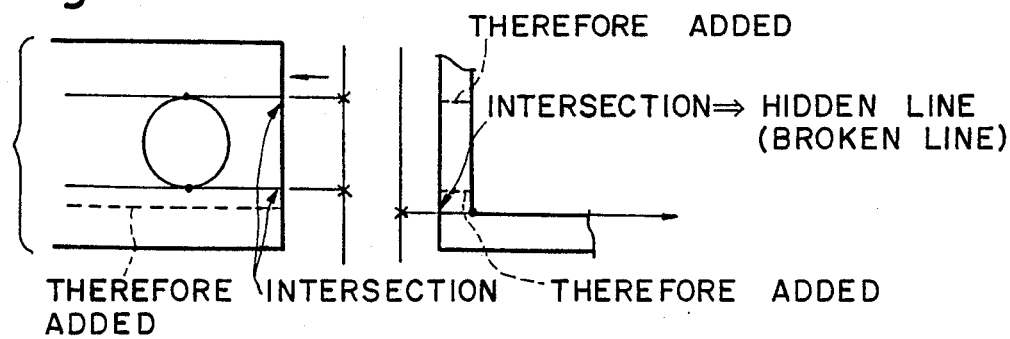
Figure 35:
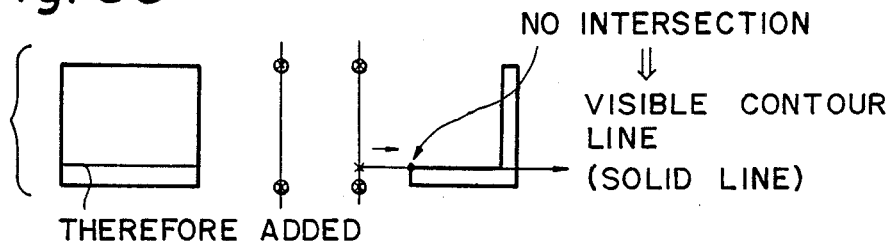
Figure 36:
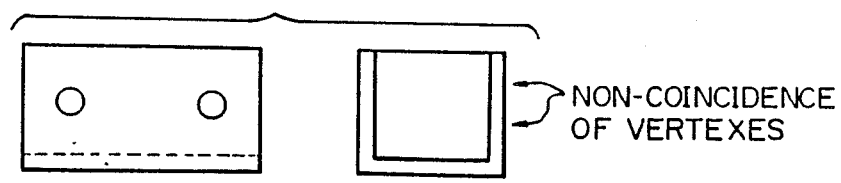
FIGS. 36 and 37 show processes of addition of line segments based on a region of a centerline.
Figure 37:
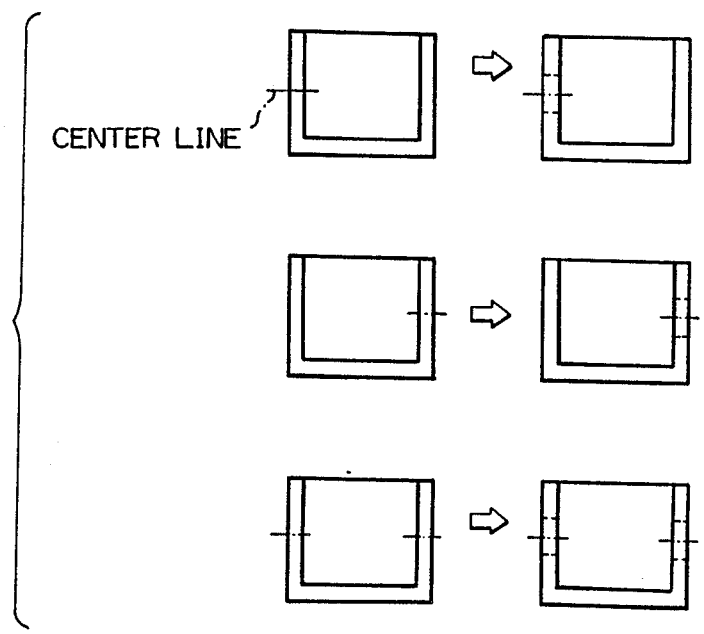
Figure 38:
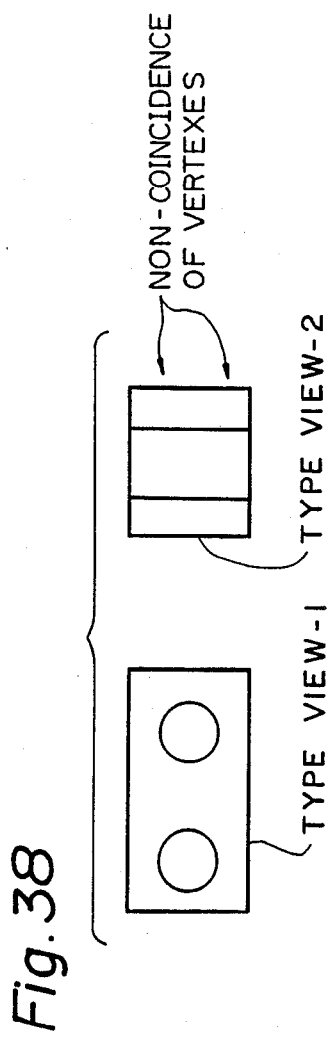
FIGS. 38 and 39 show processes of addition of line segments not based on centerlines.

The processing will be explained below. First, the omitted line segment type and interval extraction unit 812 deduces if there is an omitted line segment at a contradiction position, discriminates whether the contour line thought to be omitted is a visible contour line or hidden line, then finds the line segment interval omitted. First, the discrimination of the type of the omitted line segment is made using the criteria of the correspondence axis shown in FIG. 32, noting the noncoincidence of the vertex positions as shown in FIG. 33, drawing a vertical line from the corresponding axis with respect to the view side where the noncoincidence is as shown by FIG. 34, and determining if another contour line is intersecting in the interval to the vertex of the location of the noncoincidence point within the same view. When an intersection exists as shown in FIG. 34, it is determined to be a hidden line. When there is no intersection as shown in FIG. 35, it is determined to be a visible contour line. Next, the extraction of the addition interval of the omitted line segment may be performed in two ways. One way is, as shown in FIGS. 36 and 37, to search the range wherein the centerline obtained by the supplementary line data is drawn and to find the interval of intersection of the contour line in that range as the addition interval. The other way is, as shown in FIG. 38 and FIG. 39, to ignore the centerline and to scan for points of noncoincidence, that is, insufficiencies, between view 1 and view 2, find all positions of intersection of the contour line, give numbers to the intersection positions of the contour line in the order from the corresponding axis side, and make the interval from an odd number to be an additional interval, or make the interval from an even number to an odd number to be an additional to an even number interval. It is possible to designate in advance which means is to be selected. Further, the dialog processing unit 814 of FIG. 29 may be questioned and instructions received each time.

The omitted line segment addition unit 813 of FIG. 29 adds and registers the omitted line segment to the contour line data of the contour line data holding unit 804 in accordance with the above-mentioned processing results.

The apparatus of FIG. 29 automatically extracts and recognizes the omitted contour line segments in machine drawings, structural drawings, and other projection drawings, thereby enabling omission-less extraction of drawing information from design drawings. Further, the positions of omitted line segments and the positions of contradiction locations can be notified to the succeeding CAD system, thereby lightening the work load at the CAD terminals and enabling a reduction of the manhours needed for obtaining processed information.

((Examples of structures of Main Units of Apparatuses))

Figure 42:
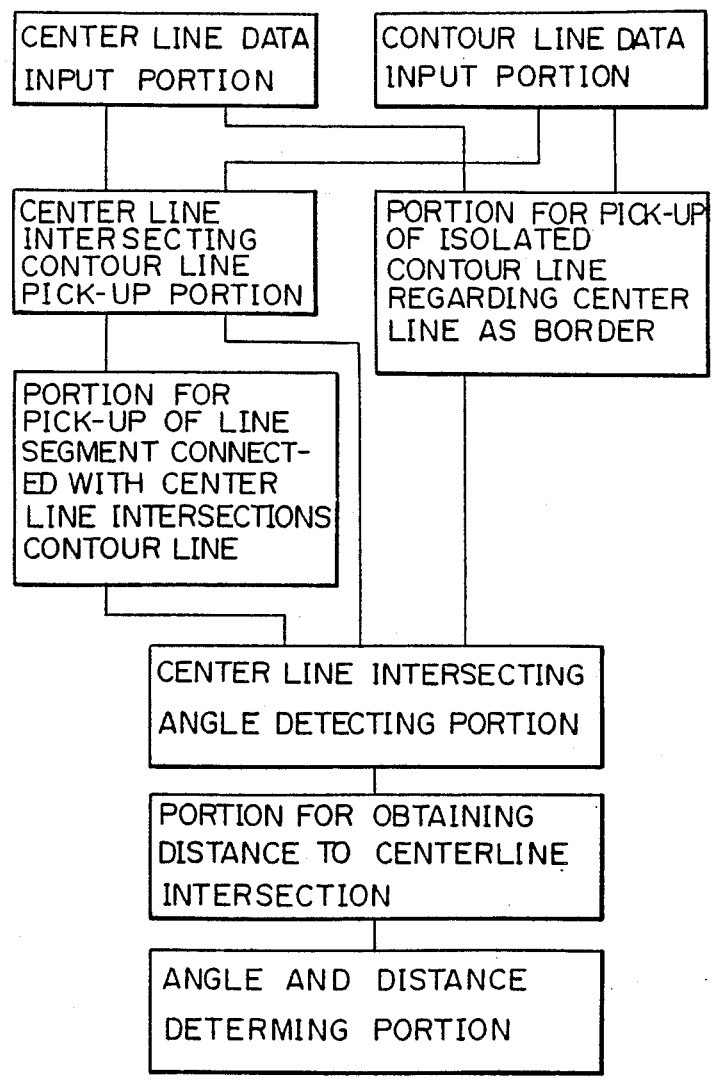
FIG. 42 to FIG. 50 show examples of structures of the main units of the apparatuses of FIGS. 3, 6, 15, and 29.
Figure 43:
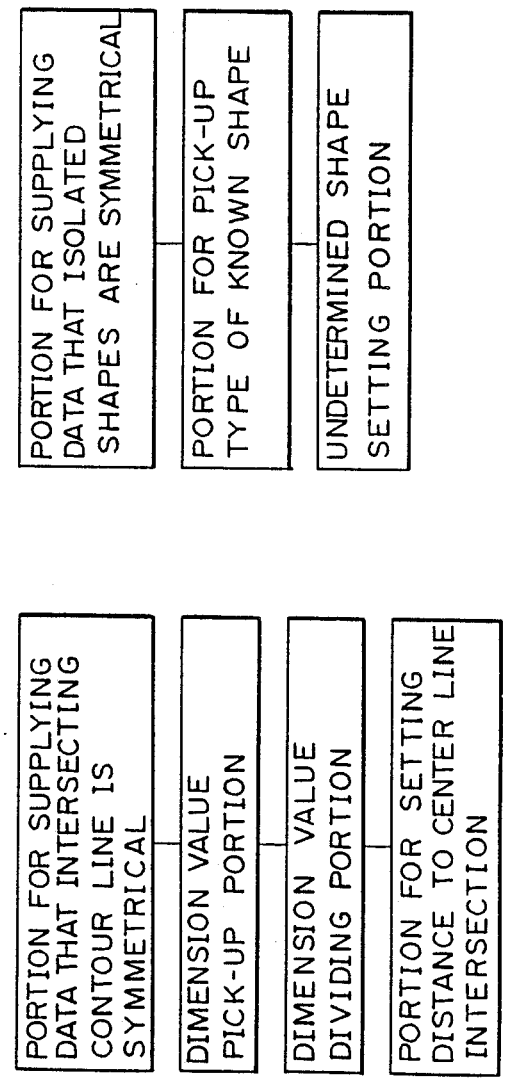

Examples of the symmetry determination unit and the contour line setting unit in the apparatus of FIG. 3 are shown in FIGS. 42 and 43.

Figure 44:
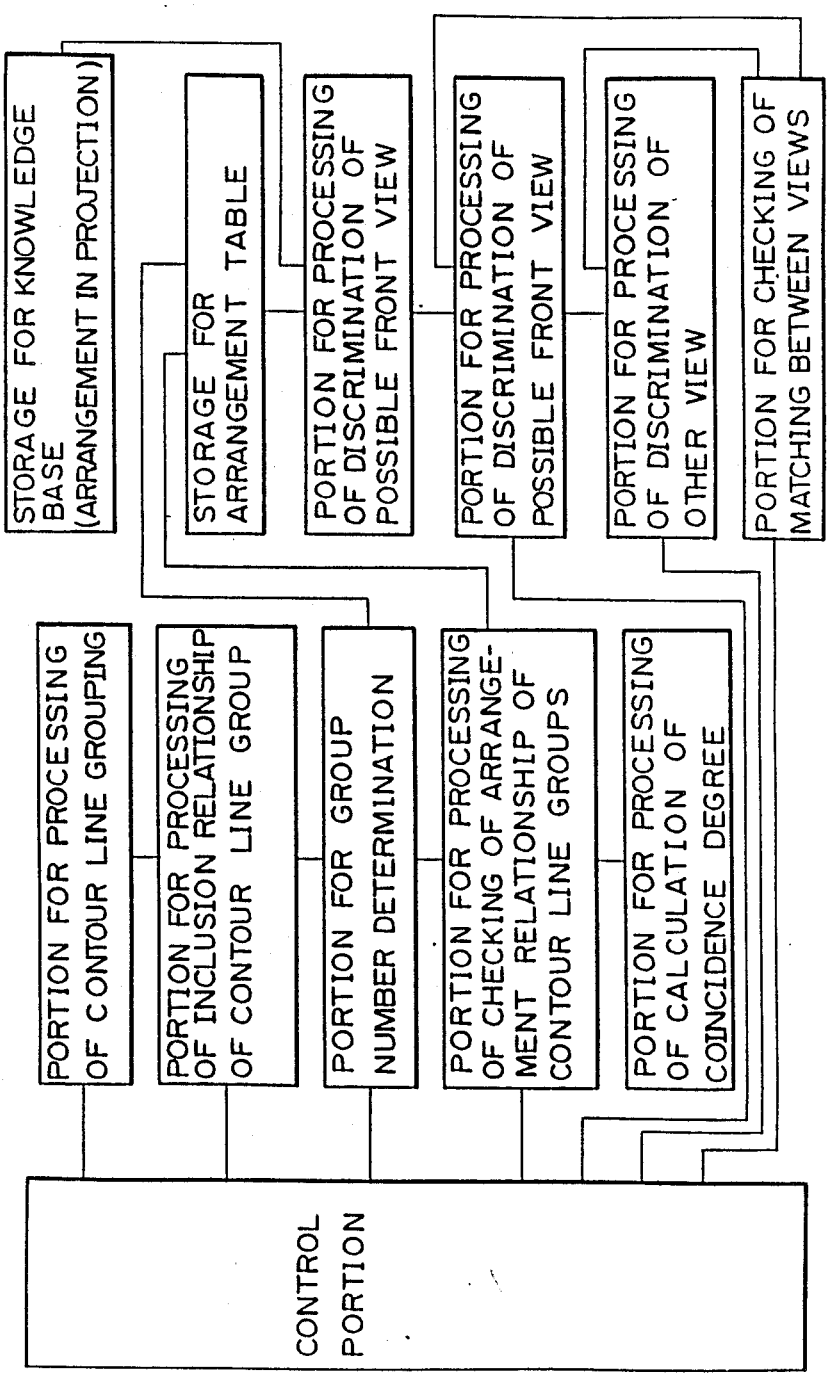

An example of the view discrimination unit in the apparatus of FIG. 6 is shown in FIG. 44.

Figure 45:
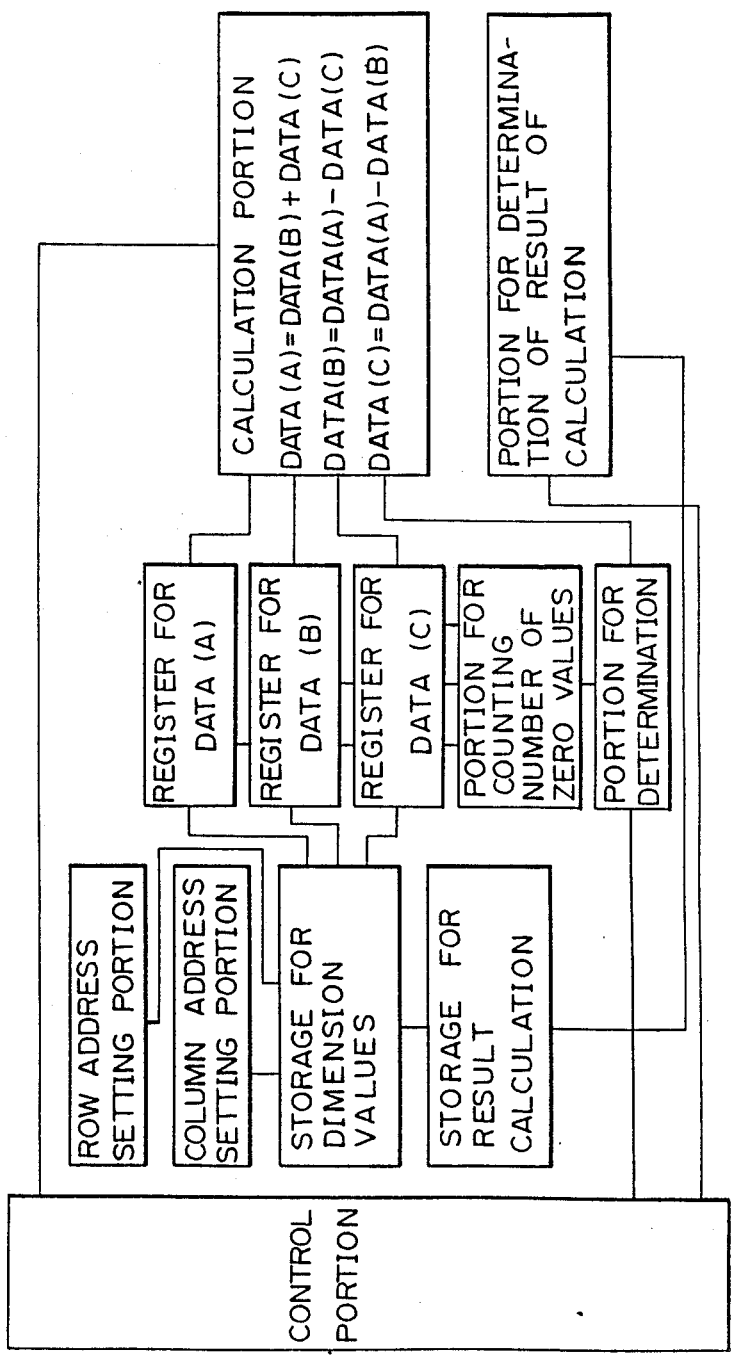
Figure 46:
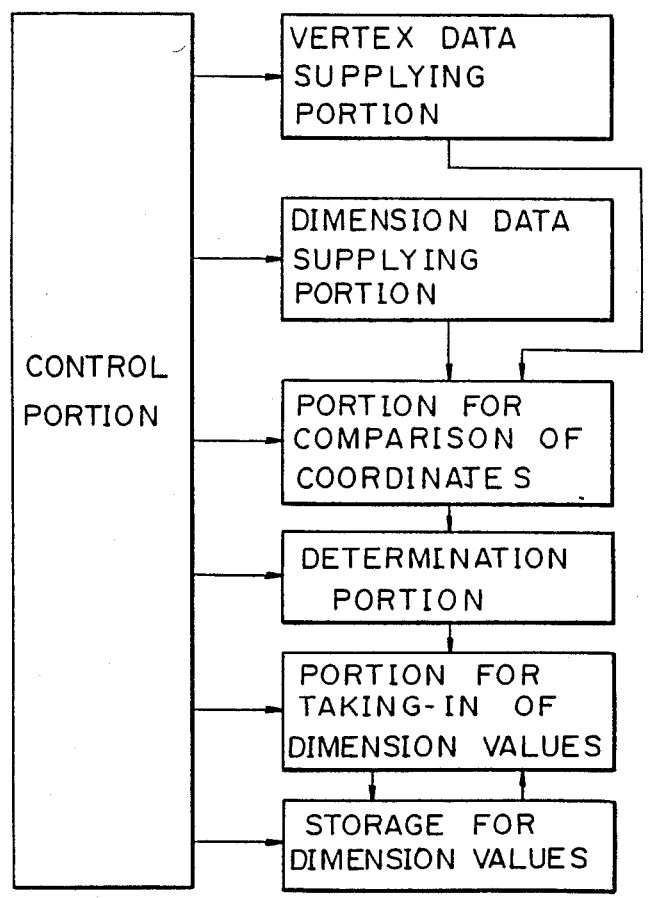
Figure 47:
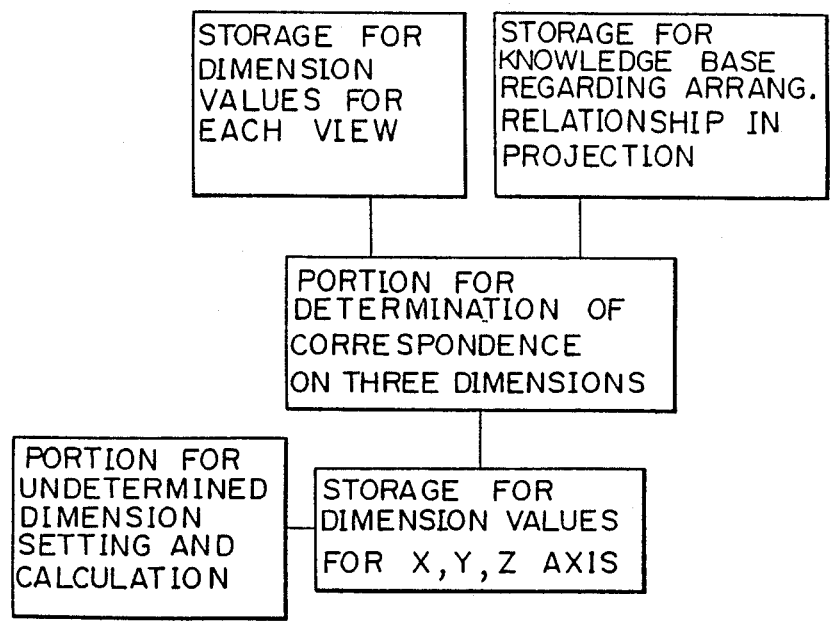

Examples of the undetermined dimension setting and calculation unit, the dimension setting unit, the dimension setting unit using the correspondence among the three views in the apparatus of FIG. 15 are shown in FIGS. 45, 46, and 47.

Figure 48:
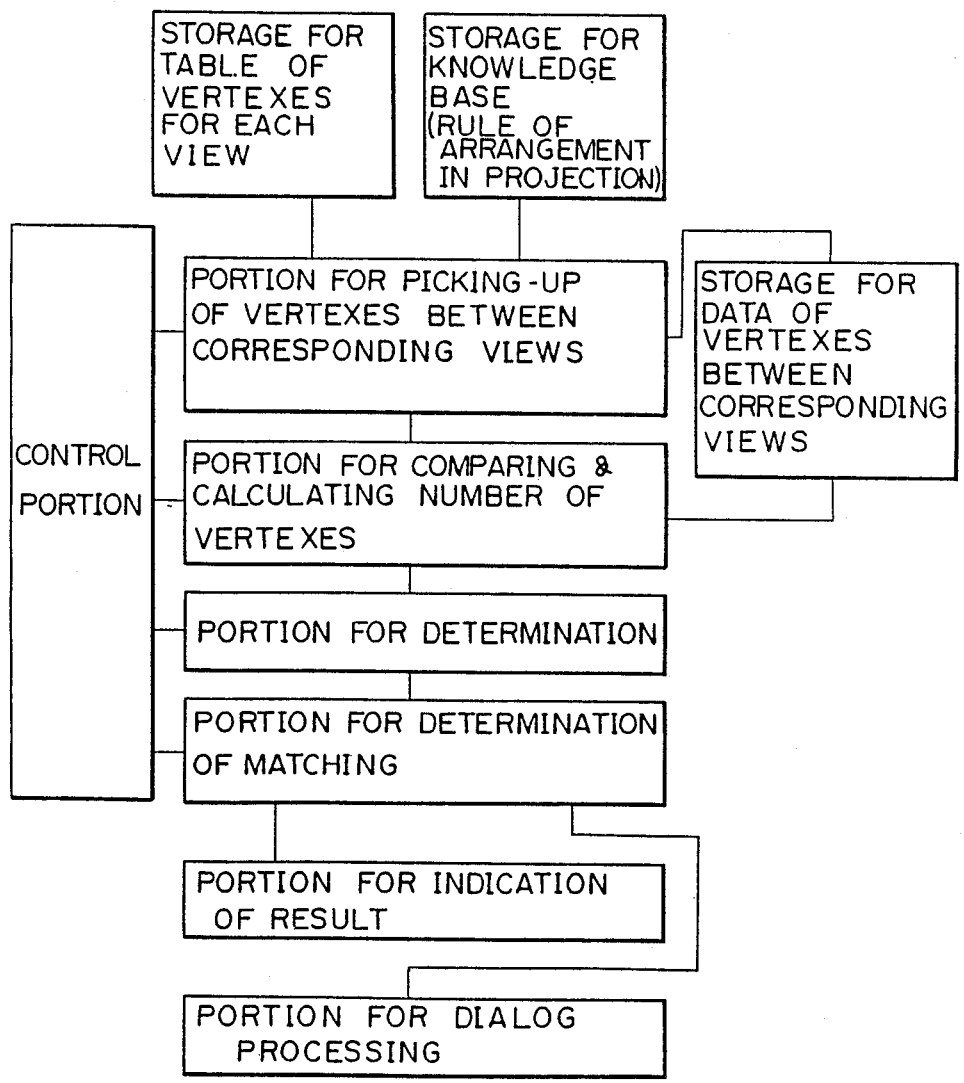
Figure 49:
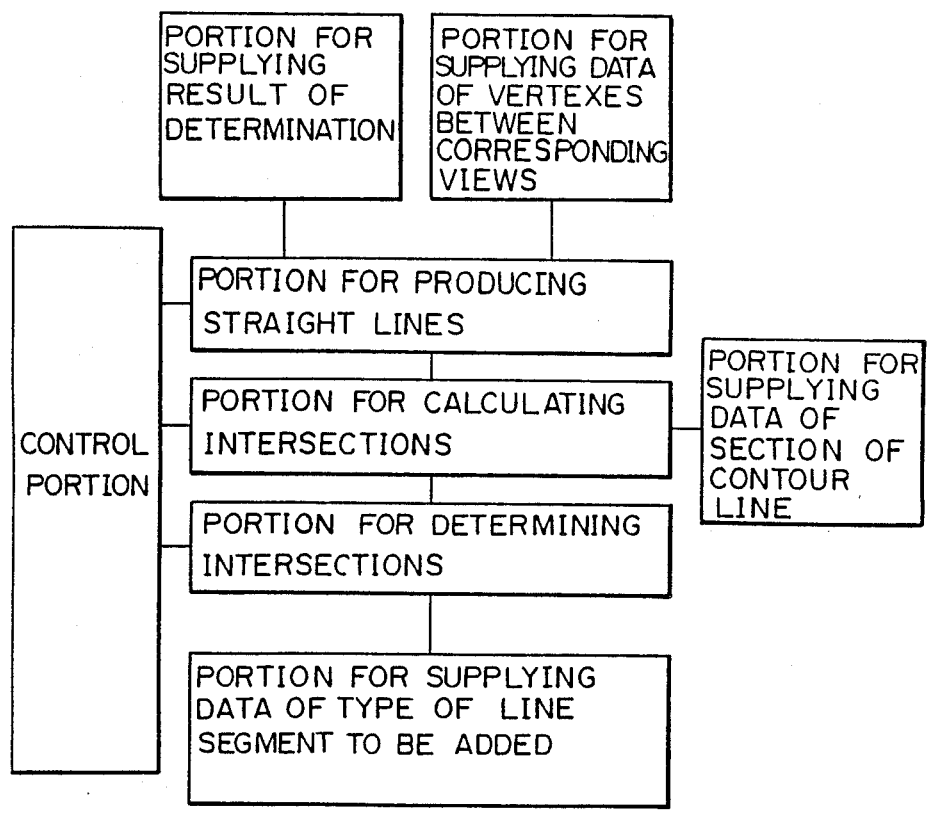
Figure 50:
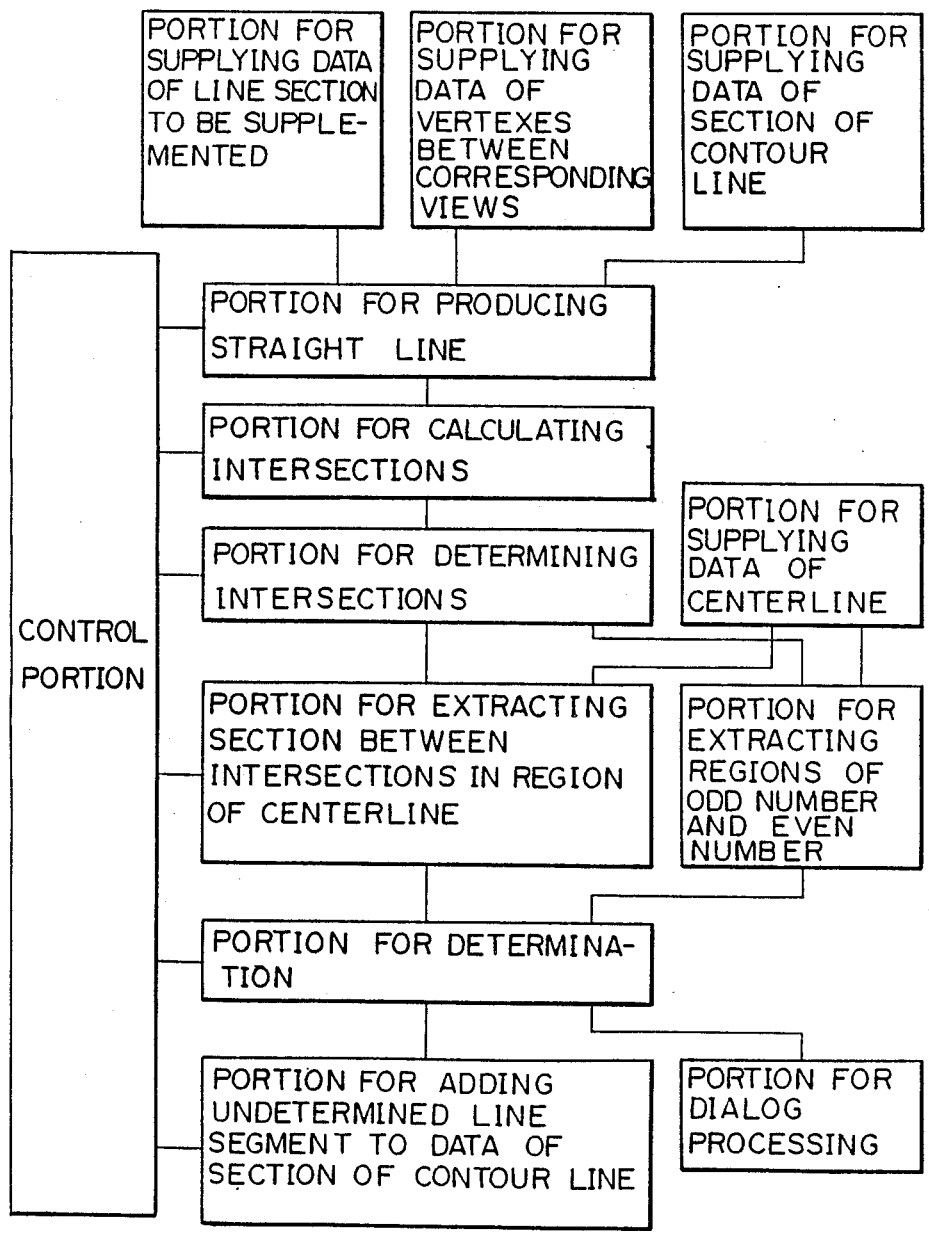

Examples of the matching check unit, the omitted line segment type and interval extraction unit, and the omitted line segment addition unit in the apparatus of FIG. 29 are shown in FIGS. 48, 49, and 50.

We claim:

1. An apparatus for recognition of shapes in drawings for automatic drawing input in a CAD system, said apparatus comprising:

drawing reading means for producing image data including vectorized image data, based on reading of a drawing;

character recognition means for recognizing types of shapes and characters including lengths, angles, and the like of contour lines based on the image data and producing character recognition data based on said recognition;

line segment discrimination means for discriminating types of line segments in accordance with definitions assigned to each type of line segment based on the vectorized image data and producing line segment discrimination data based on said discrimination;

centerline extraction means for extracting centerlines drawn in center positions of shapes from the line segments discriminated by said line segment discrimination means based on the image data, the character recognition data, and the line segment discrimination data and producing centerline extraction data based on said extraction;

symmetry determination means, responsive to the image data and the centerline extraction data, for determining symmetry of a symmetrical shape based on intersections between the extracted centerlines and straight lines between endpoints of contour lines, distances between the endpoints of contour lines and the intersections, and angles between the centerlines and the straight lines between end points of contour lines and for producing symmetry data; and figure recognition means, responsive to the image data and the symmetry data, for recognizing at least one of an undetermined shape, a length of an undetermined line segment, and a position of the undetermined line segment undiscriminated by the line segment discrimination means, using at least one of the symmetical shape and the length and position of one of the line segments discriminated by said line segment discrimination means, and the character recognition data from said character recognition means.

2. An apparatus for recognition of views in drawings for automatic drawing input in a CAD system, said apparatus comprising:

drawing reading means for reading a drawing to produce drawing data including point information;

vector forming means for receiving the drawing data from said drawing reading means and producing vector data by deriving line information from the point information in the drawing data;

figure element separation means for receiving the vector data from said vector forming means and carrying out separation of figure elements in the vector data to produce separated figure element data;

line type discrimination means for receiving the separated figure element data from said figure element separation means and carrying out discrimination of types of lines in the separated figure element data to produce line type discrimination data; and view discrimination means for receiving the line type discrimination data from said line type discrimination means and grouping contour lines, checking an inclusive relationship, counting a number of non-inclusive contour lines, and determining a view in accordance with a predetermined criteria in correspondence with the number of non-inclusive contour lines to produce a discrimination conclusion concerning the views.

3. An apparatus according to claim 2, wherein said view discrimination means includes:

calculating means for calculating the number of non-inclusive contour lines and for calculating a degree of coincidence to register the degree of coincidence calculated in a positional relationship table when the number of non-inclusive contour lines is counted as greater than three;

comparing means for comparing the degree of coincidence with a reference positional relationship based on rules of projection to produce a comparison result; and means for determining the view from the comparison result of said comparing means.

4. An apparatus for recognition of shapes in drawings for automatic drawing input in a CAD system, said apparatus comprising:

classification means for classifying data of a drawing into character data and line segment data;

character discrimination means for receiving the character data from said classification means and discriminating types of shapes and characters based on the character data to produce character discrimination data;

line segment discrimination means for receiving the line segment data from said classification means and discriminating types of line segments to produce line segment discrimination data, the types of line segments include one of a contour line and a supplementary line;

correspondence determination means for receiving the character discrimination data and the line segment discrimination data respectively from said character discrimination means and said line segment discrimination means and for determining correspondence between the character discrimination data and the line segment discrimination data;

view discrimination means for receiving the line segment discrimination data from said line segment discrimination means and discriminating a view by grouping contour lines for each view too produce view discrimination data;

vertex determination means for receiving the view discrimination data from said view discrimination means and determining vertexes of the contour lines;

first dimension setting means for receiving data from said correspondence determination means and said vertex determination means and setting dimensional values to the contour lines corresponding to portions of views having indications of dimensions;

dimension calculation means for receiving data from said first dimension setting means and calculating dimensional values of the contour lines of portions without indications of dimensions using known dimensional values; and second dimension setting means for receiving data from said dimension calculation means and, utilizing correspondence between views in accordance with a projection system, setting the dimensional values known in another one of the views or the dimensional values calculated in said dimension calculating means on the basis of the known dimensional values to the contour lines of the view.

5. An apparatus for recognition of shapes in drawings for automatic drawing input in a CAD system, said apparatus comprising:

contour line discrimination means for discriminating contour lines in drawings;

view discrimination means for discriminating views in drawings;

data storage means for receiving data from said contour line discrimination means and said view discrimination means and storing the data received;

vertex acquisition means for receiving data from said data storage means, confirming the contour lines on X and Y axes, and deriving coordinates of endpoints of the contour lines;

matching check means for receiving data from said vertex acquisition means and pattern data from a knowledge base, comparing the views based on correspondence between positions of vertexes of the contour lines and position identification numbers of the vertexes to detect contradictory portions and storing results of the comparison as match data; and line segment addition means for receiving the match data from said matching check means and, when a contradictory portion is detected, selecting a particular type of line segment to be supplemented to a view having a vertex not satisfying the correspondence of said matching check means, producing a line segment of the particular type, and adding the line segment to the drawing produced.

6. An apparatus according to claim 5, wherein, when a view, having a centerline, includes a line segment which should be indicated is not indicated, then endpoints of line segments to be added within a region of shape where the centerline is indicated are obtained.

7. An apparatus according to claim 5, wherein said apparatus further comprises dialog processing means for determining a region of shape to which the line segment is to be added, and wherein, when there are a plurality of possible regions of shape to which a line segment is to be added, the data of the plurality of possible regions of shape is supplied to said dialog processing means.

* * * * *

UNITED STATES PATENT AND TRADEMARK OFFICE
CERTIFICATE OF CORRECTION

PATENT NO. : 4,933,865
DATED : June 12, 1990
INVENTOR(S) : Yamamoto et al.

It is certified that error appears in the above-identified patent and that said Letters Patent is hereby corrected as shown below:

Title page, Page 2, OTHER PUBLICATIONS, line 8,

"and Systems (Jul." should be

--and Manufacture of Electronic Components, Circuits and Systems (Jul.--.

Col. 4, line 56, "the, apparatus" should be

--the apparatus--;

Col. 7, line 55, "FIG. 6,." should be

--FIG. 6.--.

Col. 12, line 42, in the equation: "$1_{n-1,n)}+$"

should be --$1_{(n-1,n)}+$--.

Col. 18, line 24, "too" should be --to--.

Signed and Sealed this

Seventeenth Day of March, 1992

Attest:

HARRY F. MANBECK, JR.

*Attesting Officer*   *Commissioner of Patents and Trademarks*